United States Patent
Santra et al.

(10) Patent No.: US 10,746,625 B2
(45) Date of Patent: Aug. 18, 2020

(54) SYSTEM AND METHOD OF MONITORING A STRUCTURAL OBJECT USING A MILLIMETER-WAVE RADAR SENSOR

(71) Applicant: Infineon Technologies AG, Neubiberg (DE)

(72) Inventors: Avik Santra, Munich (DE); Jagjit Singh Bal, Fremont, CA (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 341 days.

(21) Appl. No.: 15/852,907

(22) Filed: Dec. 22, 2017

(65) Prior Publication Data

US 2019/0195728 A1 Jun. 27, 2019

(51) Int. Cl.
| | |
|---|---|
| G01M 5/00 | (2006.01) |
| G01S 13/88 | (2006.01) |
| G01S 7/41 | (2006.01) |
| G01S 13/89 | (2006.01) |
| G01S 13/90 | (2006.01) |

(52) U.S. Cl.
CPC ........... *G01M 5/0091* (2013.01); *G01S 7/411* (2013.01); *G01S 13/88* (2013.01); *G01S 13/89* (2013.01); *G01S 13/9023* (2013.01)

(58) Field of Classification Search
CPC .... G01M 5/00; G01M 5/0008; G01M 5/0016; G01M 5/0025; G01M 5/0033; G01M 5/0041; G01M 5/005; G01M 5/0058; G01M 5/0066; G01M 5/0075; G01M 5/0091; G01S 13/4454; G01S 13/88
See application file for complete search history.

(56) References Cited

U.S. PATENT DOCUMENTS

| | | | | | |
|---|---|---|---|---|---|
| 4,480,480 | A | * | 11/1984 | Scott | E02B 17/0034 702/41 |
| 6,246,355 | B1 | * | 6/2001 | Miceli | G01S 7/412 342/175 |
| 6,496,136 | B1 | * | 12/2002 | Mucciardi | G01S 7/411 342/179 |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Pieraccini, M., D. Dei, D. Mecatti, "Interferometric radar for testing large structures with a built-in seismic accelerometer", Sensors and Actuators A: Physical, Dec. 2013, pp. 25-30. (Year: 2013).*

(Continued)

*Primary Examiner* — Peter M Bythrow

(74) *Attorney, Agent, or Firm* — Slater Matsil, LLP

(57) ABSTRACT

In accordance with an embodiment, a method of monitoring a structural object includes performing a first set of radar measurements using a first millimeter-wave radar sensor to produce a first set of radar data, extracting a first interferometric phase from the first set of radar measurements, and determining a structural integrity of the structural object based on the extracted first interferometric phase.

21 Claims, 18 Drawing Sheets

(56) References Cited

U.S. PATENT DOCUMENTS

| | | | |
|---|---|---|---|
| 8,102,305 B2* | 1/2012 | Otts | G01S 13/888 342/52 |
| 8,384,583 B2* | 2/2013 | Leva | G01S 13/9023 342/156 |
| 8,686,362 B2* | 4/2014 | Bakhtiari | A61B 5/0507 250/338.1 |
| 9,014,415 B2* | 4/2015 | Chen | G06T 7/0002 382/100 |
| 9,036,861 B2* | 5/2015 | Chen | G06T 7/0002 382/100 |
| 9,103,904 B2* | 8/2015 | Liao | G01S 13/583 |
| 9,823,112 B2* | 11/2017 | Zemp | G01B 5/30 |
| 10,121,241 B1* | 11/2018 | Jacob | G06T 7/001 |
| 10,139,806 B2* | 11/2018 | Szarski | G05B 19/4097 |
| 10,436,888 B2* | 10/2019 | Li | G01S 7/10 |
| 10,503,157 B2* | 12/2019 | Endrerud | G05B 23/00 |
| 2003/0179127 A1 | 9/2003 | Wienand | |
| 2004/0238857 A1 | 12/2004 | Beroz et al. | |
| 2005/0265124 A1* | 12/2005 | Smith | B23Q 17/098 367/128 |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0029276 A1* | 2/2011 | Cabral Martin | G01M 5/00 702/141 |
| 2011/0299433 A1 | 12/2011 | Darabi et al. | |
| 2012/0033851 A1* | 2/2012 | Chen | G06T 7/0002 382/100 |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0082866 A1* | 4/2013 | Jaganathan | G01S 13/88 342/22 |
| 2013/0106673 A1 | 5/2013 | McCormack et al. | |
| 2013/0216089 A1* | 8/2013 | Chen | G06T 7/0002 382/100 |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Saverio et al. | |
| 2016/0320852 A1 | 11/2016 | Poupyrev | |
| 2016/0320853 A1 | 11/2016 | Lien et al. | |
| 2016/0327633 A1 | 11/2016 | Kumar et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0299427 A1* | 10/2017 | Nohmi | G01H 9/00 |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |

(56) References Cited

FOREIGN PATENT DOCUMENTS

| WO | 2013009473 A2 | 1/2013 |
|----|---------------|--------|
| WO | 2016033361 A1 | 3/2016 |

OTHER PUBLICATIONS

Pieraccini, M., "Monitoring of Civil Infrastructures by Interferometric Radar: A Review", The Scientific World Journal, vol. 203, 2013 (Year: 2013).*

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gigie, Andrew et al., "Novel Approach for Vibration Detection Using Indented Radar", Progess in Electromagnetic Research C, vol. 87, pp. 147-162, Oct. 4, 2018.

* cited by examiner

| Radar Sensor 1 | Radar Sensor 2 |
|---|---|
| 30 | 32 |
| 52 | 47 |
| 98 | 101 |

*Before Alignment*

| Radar Sensor 1 | Radar Sensor 2 |
|---|---|
| 30 | 32 |
| 52 | 47 |
| 98 | 101 |

41 → ... ←39  46
51 ... ←51

*After Alignment*

SYSTEM AND METHOD OF MONITORING A STRUCTURAL OBJECT USING A MILLIMETER-WAVE RADAR SENSOR

TECHNICAL FIELD

The present invention relates generally to a system and method, and, in particular embodiments, to a system and method of monitoring a structural object using a millimeter-wave radar sensor.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF signal, as well as the associated RF circuitry used to generate the transmitted signal and to receive the RF signal. In some cases, multiple antennas may be used to implement directional beams using phased array techniques. A MIMO configuration with multiple chipsets or a multichannel chip can be used to perform coherent and non-coherent signal processing, as well.

SUMMARY

In accordance with an embodiment, a method of monitoring a structural object includes performing a first set of radar measurements using a first millimeter-wave radar sensor to produce a first set of radar data, extracting a first interferometric phase from the first set of radar measurements, and determining a structural integrity of the structural object based on the extracted first interferometric phase.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method of monitoring a structural object using a millimeter-wave radar sensor. The invention may also be applied to other RF-based systems and applications that monitor the status of physical structures.

Structural health monitoring of bridges is conventionally performed using accelerometers, strain-gauges, and linear variable differential transformers (LVDT) that are physically connected to the bridge. In some cases, performing the structural health monitoring of the bridge may temporarily restrict use of the bridge in order to allow technicians to gain access to structural members of the bridge. The work involved in performing structural testing may be fairly hazardous, time consuming and costly.

In embodiments of the present invention, a radar system is used to monitor the physical integrity of structural objects such as bridges, buildings, dams, power plants, and wind turbines using interferometry techniques that involve retrieving the variation of wave signals' propagation paths in the order of fractions of their operating wavelength. For example, a millimeter-wave radar sensor performs radar measurements of the structural object and an interferometric phase is determined from the radar measurements. These radar measurements may include, for example, range data, velocity data and angle data of the structural object being measured. Deflection and/or vibration of the structural object are related to the interferometric phase. Variations of the interferometric phase may be tracked in slow-time with an accuracy ranging from sub-millimeter to micrometric displacement amplitudes in some embodiments. In various embodiments, one or more millimeter-wave radar sensors may be permanently situated on or near the structural object to allow for a continuous assessment of the structural integrity of the structural object. If a calculated deflection and/or vibration exceeds a predetermined threshold, a message can be transmitted that alerts responsible personnel to take corrective action.

Figure 1A:
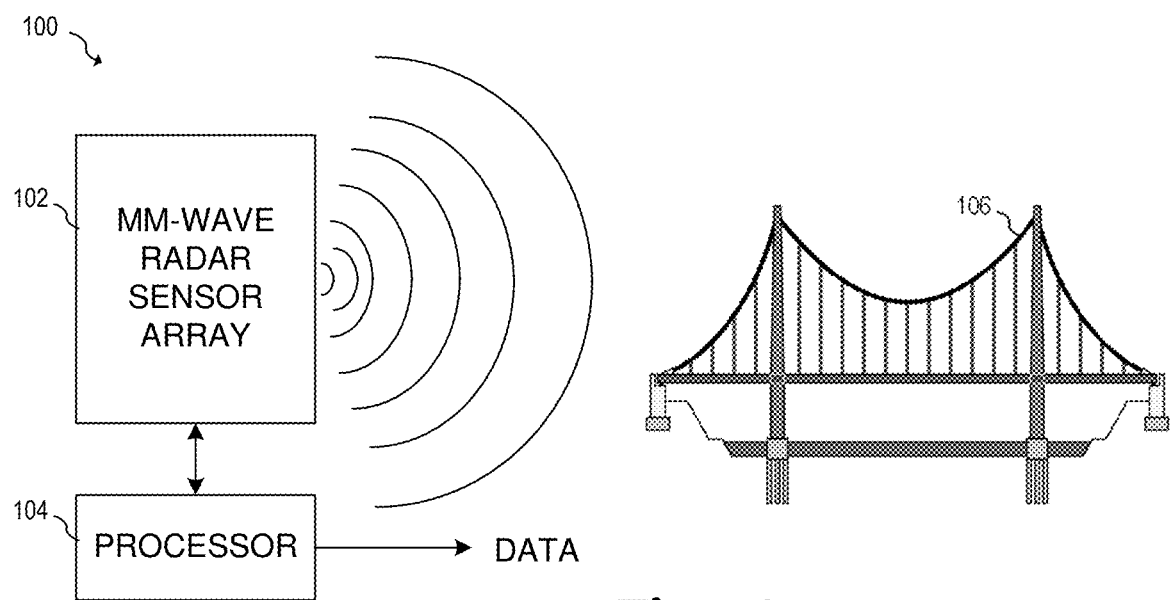
FIG. 1A illustrates a block diagram of an embodiment radar-based structural monitoring system.

FIG. 1A illustrates a block diagram of radar-based structural monitoring system 100. As shown, radar-based structural monitoring measuring system 100 includes a millimeter-wave radar sensor 102, and a processor 104 that controls the operation of millimeter-wave radar sensor 102 and performs various radar signal processing operations on the data produced by millimeter-wave radar sensor 102. During operation, millimeter-wave radar sensor 102 transmits millimeter-wave RF signals that are reflected by structural object 106. While structural object 106 is depicted in the illustration as a bridge, it should be understood that object 106 may one of among a variety of structural objects such as bridges, building, power plants, dams, windmills, utility poles and streetlights. The reflected signals are received by millimeter-wave radar sensor 102 and are converted to a digital representation and processed by processor 104 to determine, for example, whether the shape of structural object has been deformed. The result of this processing produces various data (represented by signal DATA) indicative of the structural health of structural object 106. While only a single millimeter-wave radar sensor 102 is shown in FIG. 1A, it should be understood that a plurality of millimeter-wave radar sensors may be used to monitor structural object 106.

Figure 1B:
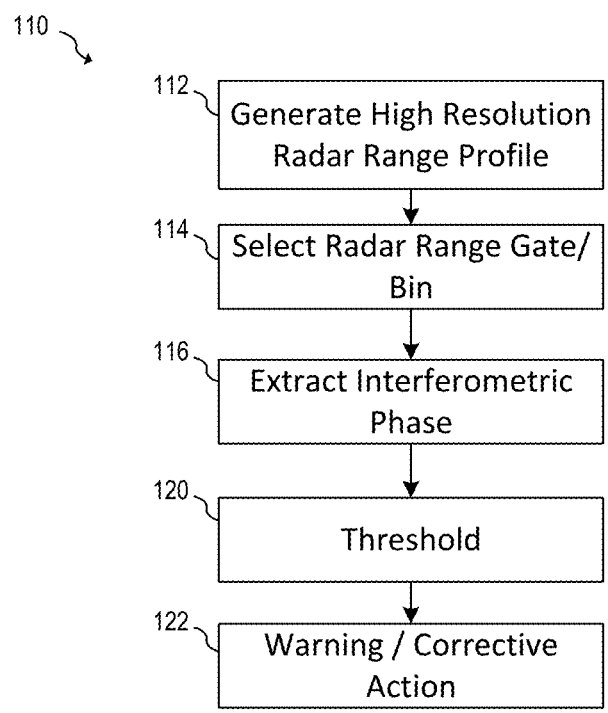
FIG. 1B illustrates a block diagram of an embodiment structural monitoring method.

FIG. 1B illustrates a block diagram of an embodiment method 110 of monitoring a structural object using a millimeter-wave radar sensor. In step 112, a high resolution radar range profile is generated using one or more millimeter-wave sensors, such as millimeter-wave radar sensor 102 shown in FIG. 1A. In various embodiments, this high resolution radar range profile may be in the form of an array of distances, also known as range gates, and an amplitude and phase associated with each distance or range gate. Range gates that show the highest amplitudes are generally associated with the distance between a particular object and the millimeter-wave radar sensor. Multiple structural features of an object or multiple objects within the field of view of the millimeter-wave radar sensor may appear as higher amplitude range gates in comparison to other range gates.

In step 114, range gates showing the highest amplitudes that correspond to possible features of the structural object are identified for further processing; and in step 116 an interferometric phase is extracted for one or more of the identified range gates or features. This interferometric phase is determined using a bank of Doppler filters based on the input from multiple millimeter-wave radar sensors in some embodiments. In step 120, the interferometric phase generated in step 116 is analyzed by comparing the interferometric phase a predetermined threshold, which may be set according to the particular safety and maintenance requirements of the particular structure being monitored. In embodiments that utilize a bank of Doppler interferometric filters, each output of each filter may be compared to an individual threshold.

In some embodiments, a weighted sum or average of the interferometric phase of the various features monitored by each millimeter wave radar sensor may be compared to the threshold. If the predetermined threshold is exceeded, a warning message may be sent via a digital interface coupled to communication channel and/or corrective action may be taken in step 122. Such corrective action may include, for example, further analysis of the structural object, repair of the structural object, or corrective safety measures. For example, if a bridge being monitored shows signs of deformation that indicates that the bridge is unsafe, then the bridge may be shut down to traffic until the situation is assessed and repairs are made.

Figure 1C:
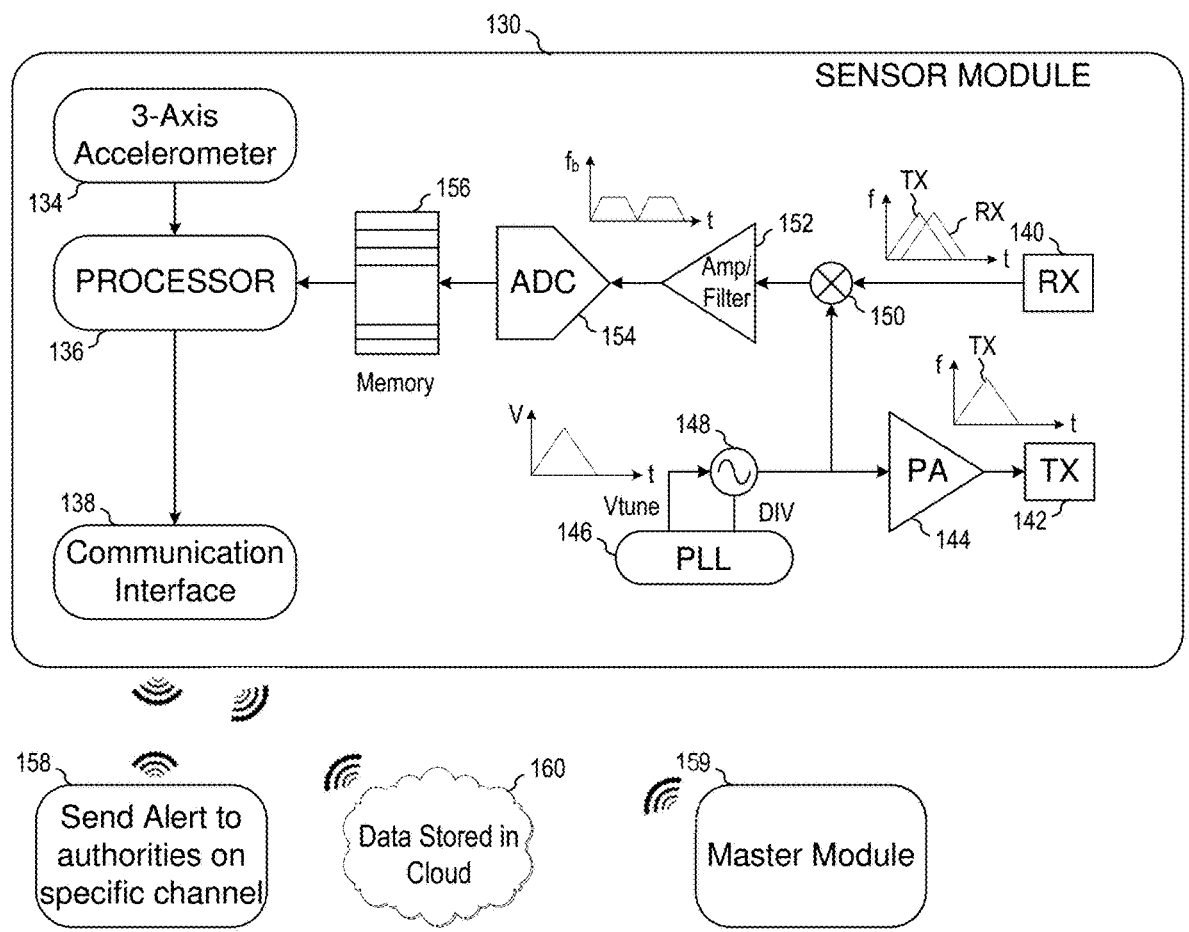
FIG. 1C illustrates a block diagram of an embodiment millimeter-wave sensor module.

FIG. 1C illustrates a block diagram of a sensor module 130 that may be used to implement embodiment radar-based structural monitoring systems. In various embodiments, one or more instances of sensor module 130 may be positioned within range of the structural object being monitored. As shown, sensor module 130 includes an associated radar circuitry, a three-axis accelerometer 134, a processor 136 and a communications interface 138. During operation the associated radar circuitry transmits RF signals using transmit antenna 142 and receives reflected RF signals using receive antenna 140. In an embodiment, the transmitted RF signals are generated using phase locked loop 146 in conjunction with oscillator 148. In some embodiments, a digital tuning signal is provided to phase locked loop 146 that generates tuning signal Vtune that corresponds to the profile of the digital tuning signal. In some embodiments this digital tuning signal is in the form of a chirp or frequency ramp. Such a chirp may be in the form of a sawtooth type waveform in which the frequency of oscillator 148 increases at a constant rate. (See FIG. 8B.) Alternatively, the chirp may be in the form of the sawtooth type waveform in which the frequency of oscillator 148 decreases at a constant rate. In some embodiments the tuning waveform may be in the form of a triangle wave in which the frequency of oscillator 148 increases and then decreases at a constant rate. As shown, the output of oscillator 148 is amplified by power amplifier 144, the output of which is coupled to transmit antenna 142. It should be understood that the various chirp types described herein are merely examples of the many types of chirp profiles that could be used in embodiment systems.

The reflected RF signal received by receive antenna 140 is downconverted using mixer 150. As shown, one of the inputs to mixer 150 is the output of oscillator 148. In various embodiments, the output of mixer 150 is a baseband signal having a frequency that is proportional to the distance between sensor module 130 and the particular target being measured. The propagation delay between the transmission and reception of a particular RF signal creates a frequency difference between the output of oscillator 148 and the reflected RF signal received by receive antenna 140. The length of this propagation delay is proportional to the frequency difference. Thus, higher frequency differences represent longer measured distances.

The output of mixer 150 is amplified and filtered by filtering circuitry 152, the output of which is digitized by analog-to-digital converter 154. The output of analog-to-digital converter 154 is shifted into memory 156 for access by processor 136. In various embodiments, the components of sensor module 130 including phase locked loop 146, oscillator 148, power amplifier 144, mixer 150, amplification and filtering circuitry 152, analog-to-digital converter 154, and memory 156 may be implemented using circuits and methods known in the art. It should also be understood that the implementation the associated radar circuitry of sensor module is just one example of many possible ways to implement embodiment radar sensor circuitry. In alternative embodiments, other circuits and structures known in the art may be used to implement the associated radar circuitry of sensor module 130.

Processor 136 accesses the digitized baseband signal produced by the associated radar circuitry of sensor module 130 via memory 156. In some embodiments, processor 136 also monitors the output of three-axis accelerometer 134 in order to compensate the measured output of the associated radar circuitry of sensor module 130 in accordance with the motion of sensor module 130 as measured by three axis accelerometer 134. In various embodiments, processor 136 may execute and implement the various structural integrity algorithms described herein. Alternatively, sensor module 130 may be implemented as one of a plurality of radar sensor components within a structural integrity system. For example, in some embodiments sensor module 130 may act as a slave device and transmit its measured baseband RF signals via communication 138 to a master module 159 or processor that combines the output of multiple sensor modules. In embodiments in which sensor module 130 is configured as a master module, processor 136 is configured to determine the structural integrity of the system being monitored and to transmit status data and various alert messages via communication interface 138.

Communication interface 138 may be implemented, for example, using a wired line or wireless interface that communicates with master module 159 of the structural integrity system, a cloud server 160, and/or with a monitoring authority 158, such as a utility company, governmental authority, or other organization responsible for the monitoring and/or maintenance of the structural object being monitored. Communication interface 138 may be implemented, for example, by any wired line or RF interface technology known in the art. For example, communication interface 138 may be implemented using Wi-Fi technology, wireline local area network technology, LTE/4G, Amber alert, or other interface types.

Figure 2A:
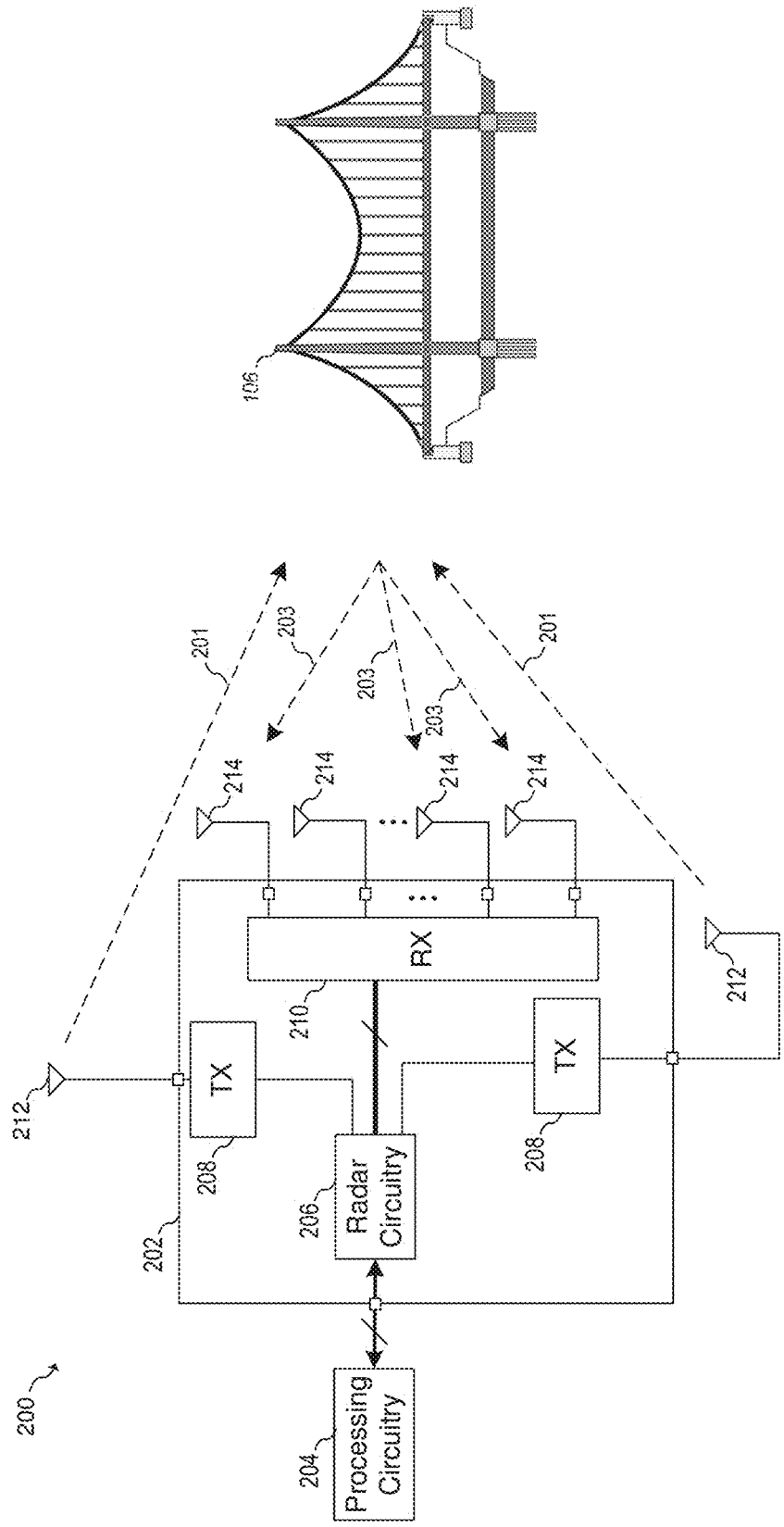
FIG. 2A illustrates a block diagram of a millimeter-wave radar sensor system.

FIG. 2A illustrates a block diagram of a millimeter-wave radar sensor system 200 that may be used to implement millimeter-wave radar sensor circuits used in the various disclosed embodiments. Millimeter-wave radar sensor system 200 includes millimeter-wave radar sensor circuit 202 and processing circuitry 204. Embodiment millimeter-wave radar sensor circuits may be implemented, for example, using a two-dimensional millimeter-wave phase-array radar that performs measurements on object 106. The millimeter-wave phase-array radar transmits and receives signals in the 30 GHz to 122 GHz range. Frequencies outside of this range may also be used. In some embodiments, millimeter-wave radar sensor circuit 202 operates as a frequency modulated continuous wave (FMCW) radar sensor having multiple transmit and receive channels or a FMCW radar sensor having a single transmit and a single receive channel. Alternatively, other types of radar systems may be used such as pulse radar, and non-linear frequency modulated (NLFM) radar to implement millimeter-wave radar sensor circuit 202.

Millimeter-wave radar sensor circuit 202 transmits and receives radio signals for determining the location of various points along structural object 106. For example, millimeter-wave radar sensor circuit 202 transmits incident RF signals 201 and receives RF signals 203 that are a reflection of the incident RF signals from object 106. The received reflected RF signals 203 are downconverted by millimeter-wave radar sensor circuit 202 to determine beat frequency signals. These beat frequency signals may be used to determine information such as the location and motion of object 106. In the specific example of FMCW radar, the beat frequency is proportional to the distance between millimeter-wave radar sensor circuit 202 and the object being sensed.

In various embodiments, millimeter-wave radar sensor circuit 202 is configured to transmit incident RF signals 201 toward structural object 106 via transmit antennas 212 and to receive reflected RF signals 203 from object 106 via receive antennas 214. Millimeter-wave radar sensor circuit 202 includes transmitter front-end circuits 208 coupled to transmit antennas 212 and receiver front-end circuit 210 coupled to receive antennas 214.

During operation, transmitter front-end circuits 208 may transmit RF signals toward object 106 simultaneously or individually using beamforming depending on the phase of operation. While two transmitter front-end circuits 208 are depicted in FIG. 2A, it should be appreciated that millimeter-wave radar sensor circuit 202 may include less than or greater than two transmitter front-end circuits 208. Thus, in various embodiments, the number of transmitters can be extended to n×m. Each transmitter front-end circuit 208 includes circuitry configured to produce the incident RF signals. Such circuitry may include, for example, RF oscillators, upconverting mixers, RF amplifiers, variable gain amplifiers, filters, transformers, power splitters, and other types of circuits.

Receiver front-end circuit 210 receives and processes the reflected RF signals from object 106. As shown in FIG. 2A, receiver front-end circuit 210 is configured to be coupled to four receive antennas 214, which may be configured, for example, as a 2×2 antenna array. In alternative embodiments, receiver front-end circuit 210 may be configured to be coupled to greater or fewer than four antennas, with the resulting antenna array being of various n×m dimensions depending on the specific embodiment and its specifications. Receiver front-end circuit 210 may include, for example, RF oscillators, upconverting mixers, RF amplifiers, variable gain amplifiers, filters, transformers, power combiners and other types of circuits.

Radar circuitry 206 provides signals to be transmitted to transmitter front-end circuits 208, receives signals from receiver front-end circuit 210, and may be configured to control the operation of millimeter-wave radar sensor circuit 202. In some embodiments, radar circuitry 206 includes, but is not limited to, frequency synthesis circuitry, upconversion and downconversion circuitry, variable gain amplifiers, analog-to-digital converters, digital-to-analog converters, digital signal processing circuitry for baseband signals, bias generation circuits, and voltage regulators.

Radar circuitry 206 may receive a baseband radar signal from processing circuitry 204 and control a frequency of an RF oscillator based on the received baseband signal. In some embodiments, this received baseband signal may represent a FMCW frequency chirp to be transmitted. Radar circuitry 206 may adjust the frequency of the RF oscillator by applying a signal proportional to the received baseband signal to a frequency control input of a phase locked loop. Alternatively, the baseband signal received from processing circuitry 204 may be upconverted using one or more mixers. Radar circuitry 206 may transmit and digitize baseband signals via a digital bus (e.g., a USB bus), transmit and receive analog signals via an analog signal path, and/or transmit and/or receive a combination of analog and digital signals to and from processing circuitry 204.

Processing circuitry 204 acquires baseband signals provided by radar circuitry 206 and formats the acquired baseband signals for transmission to an embodiment signal processing unit. These acquired baseband signals may represent beat frequencies, for example. In some embodiments, processing circuitry 204 includes a bus interface (not shown) for transferring data to other components within the structural monitoring system. Optionally, processing circuitry 204 may also perform signal processing steps used by embodiment structural monitoring systems such as a fast Fourier transform (FFT), a short-time Fourier transform (STFT), macro-Doppler analysis, micro-Doppler analysis, vital sign analysis, object classification, machine learning, and the like. In addition to processing the acquired baseband signals, processing circuitry 204 may also control aspects of millimeter-wave radar sensor circuit 202, such as controlling the transmissions produced by millimeter-wave radar sensor circuit 202.

The various components of millimeter-wave radar sensor system 200 may be partitioned in various ways. For example, millimeter-wave radar sensor circuit 202 may be implemented on one or more RF integrated circuits (RFICs), antennas 212 and 214 may be disposed on a circuit board, and processing circuitry 204 may be implemented using a processor, a microprocessor, a digital signal processor and/or a custom logic circuit disposed on one or more integrated circuits/semiconductor substrates. Processing circuitry 204 may include a processor that executes instructions in an executable program stored in a non-transitory computer readable storage medium, such as a memory to perform the functions of processing circuitry 204. In some embodiments all or part of the functionality of processing circuitry 204 may be incorporated on the same integrated circuit/semiconductor substrate on which millimeter-wave radar sensor circuit 202 is disposed.

In some embodiments, some or all portions of millimeter-wave radar sensor circuit 202 may be implemented in a package that contains transmit antennas 212, receive antennas 214, transmitter front-end circuits 208, receiver front-end circuit 210, and/or radar circuitry 206. In some embodiments, millimeter-wave radar sensor circuit 202 may be implemented as one or more integrated circuits disposed on a circuit board, and transmit antennas 212 and receive antennas 214 may be implemented on the circuit board adjacent to the integrated circuits. In some embodiments, transmitter front-end circuits 208, receiver front-end circuit 210, and radar circuitry 206 are formed on a same radar front-end integrated circuit (IC) die. Transmit antennas 212 and receive antennas 214 may be part of the radar front-end IC die, or may be implemented as separate antennas disposed over or adjacent to the radar front-end IC die. The radar front-end IC die may further include conductive layers, such as redistribution layers (RDLs), used for routing and/or for the implementation of various passive or active devices of millimeter-wave radar sensor circuit 202. In an embodiment, transmit antennas 212 and receive antennas 214 may be implemented using the RDLs of the radar front-end IC die.

Figure 2B:
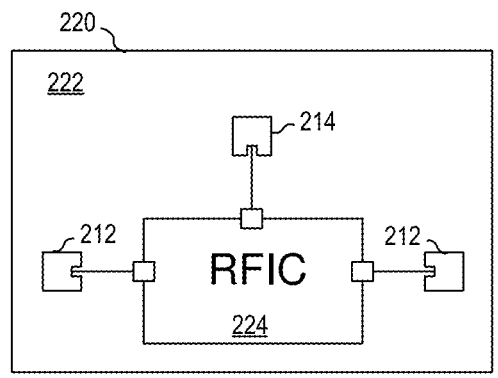
FIGS. 2B-2D illustrate plan views of embodiment millimeter-wave sensor circuits.

FIG. 2B illustrates a plan view of millimeter-wave radar sensor circuit 220 that may be used to implement millimeter-wave radar sensor circuit 202. As shown, millimeter-wave radar sensor circuit 220 is implemented as an RFIC 224 coupled to transmit antennas 212 and receive antenna 214 implemented as patch antennas disposed on or within substrate 222. In some embodiments, substrate 222 may be implemented using a circuit board on which millimeter-wave radar sensor circuit 202 is disposed and on which transmit antennas 212 and receive antennas 214 are implemented using conductive layers of the circuit board. Alternatively, substrate 222 represents a wafer substrate on which one or more RDLs are disposed and on which transmit antennas 212 and receive antennas 214 are implemented using conductive layers on the one or more RDLs.

Figure 2C:
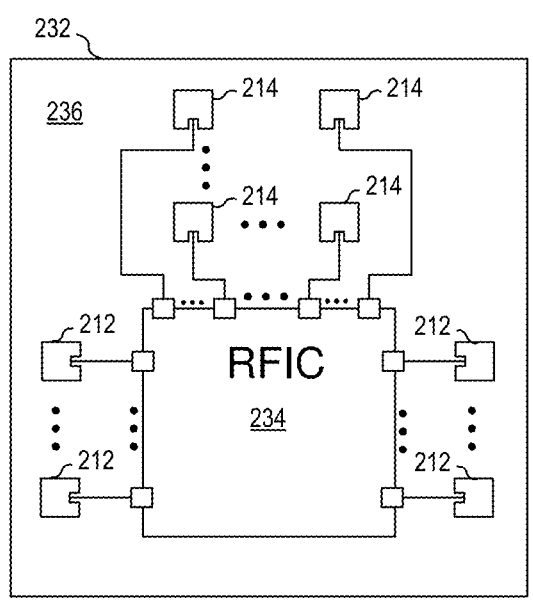

FIG. 2C illustrates a plan view of millimeter-wave radar sensor circuit 232 that includes an array of transmit antennas 212 and an array of receive antennas 214 coupled to RFIC 234 disposed on substrate 236. In various embodiments, transmit antennas 212 may form an array of m antennas and receive antennas 214 may form an array of n antennas. Each of the m transmit antennas 212 is coupled to a corresponding pin on RFIC 234 and coupled to a corresponding transmit circuit within RFIC 234; and each of the n receive antennas 214 is coupled to a corresponding pin on RFIC 234 and coupled to a corresponding receive circuit within RFIC 234. In various embodiments, the array of transmit antennas 212 and the array of receive antennas 214 may be implemented as a uniform array or a linear array of any dimension. It should be appreciated that the implementations of FIGS. 2B and 2C are just two examples of the many ways that embodiment millimeter-wave radar sensor circuits could be implemented.

Figure 2D:
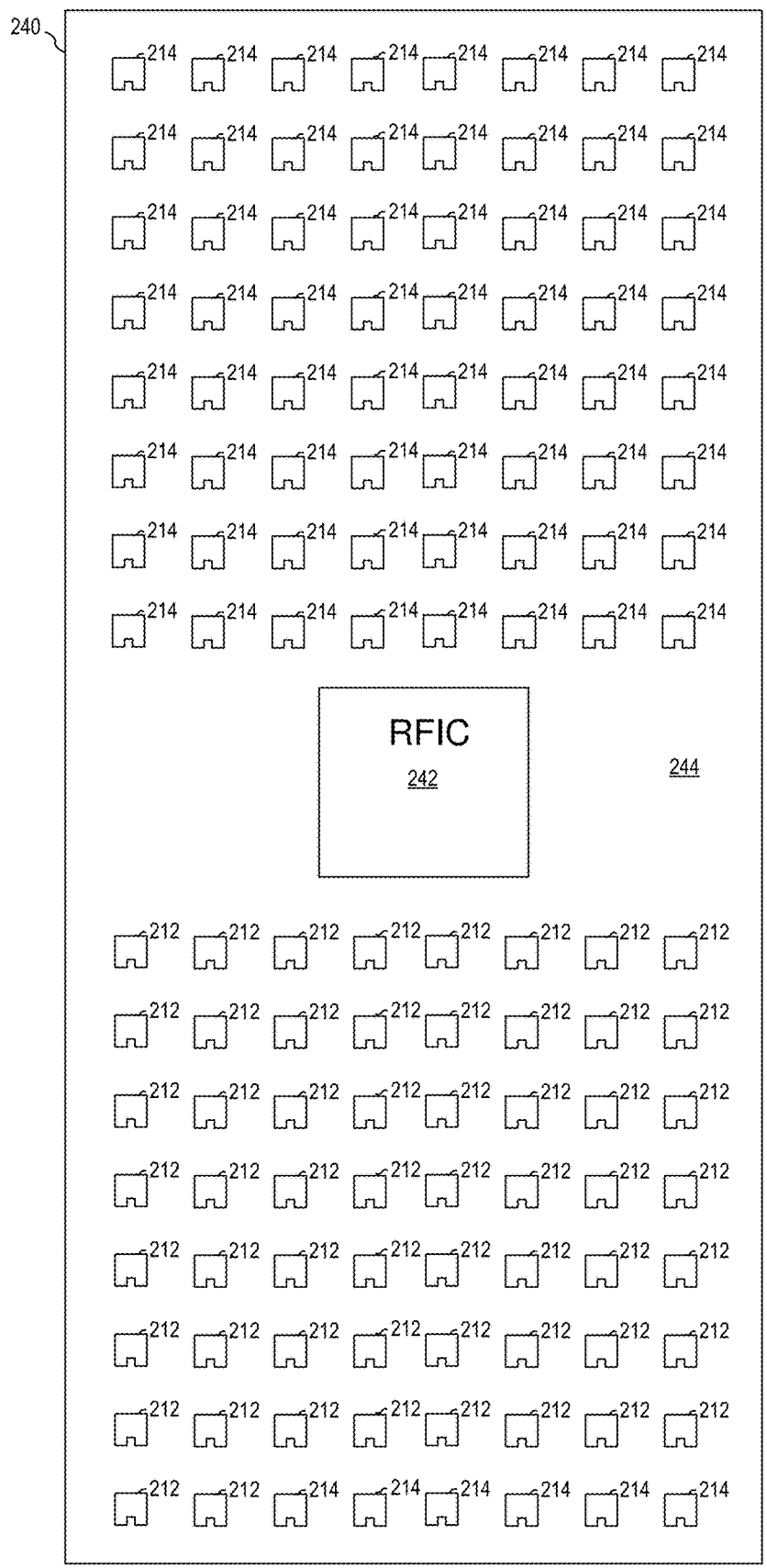

FIG. 2D illustrates a plan view of millimeter-wave radar sensor circuit 240 that includes an 8×8 array of transmit antennas 212 and an 8×8 array of receive antennas 214 coupled to RFIC 242 disposed on substrate 244. Each of the transmit antennas 212 is coupled to a corresponding pin on RFIC 242 and coupled to a corresponding transmit circuit within RFIC 242; and each of the receive antennas 214 is coupled to a corresponding pin on RFIC 234 and coupled to a corresponding receive circuit within RFIC 242. However, these connections between transmit antennas 212 and RFIC 242 and between receive antennas 214 and RFIC 242 are not shown in FIG. 2D for ease of illustration. In some embodiments, multiple radar sensors may be further arrayed in order to perform beam steering and measurements in multiple directions.

Figure 2E:
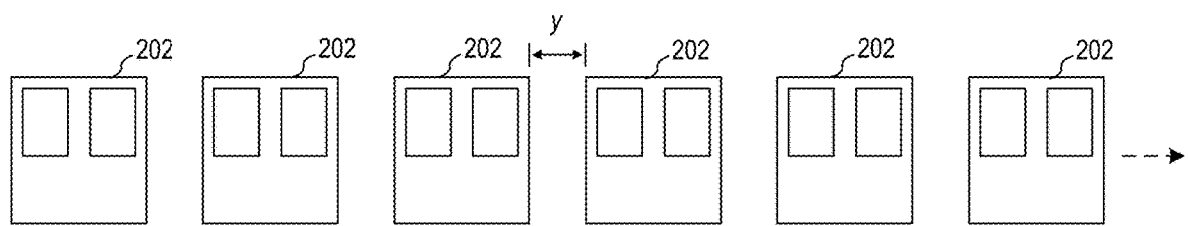
FIGS. 2E-2H illustrate various embodiment configurations for the placement of millimeter-wave radar sensors.

FIGS. 2E-2H illustrate various configurations for the placement of millimeter-wave radar sensors 202 and/or radar antennas. FIG. 2E illustrates millimeter-wave radar sensors 202 configured in a uniform linear array with a distance y between each sensor. While six millimeter-wave radar sensors 202 are shown in the illustration, it should be understood that greater or fewer than six millimeter-wave radar sensors 202 may be used depending on the specific embodiment and its specifications.

Figure 2F:
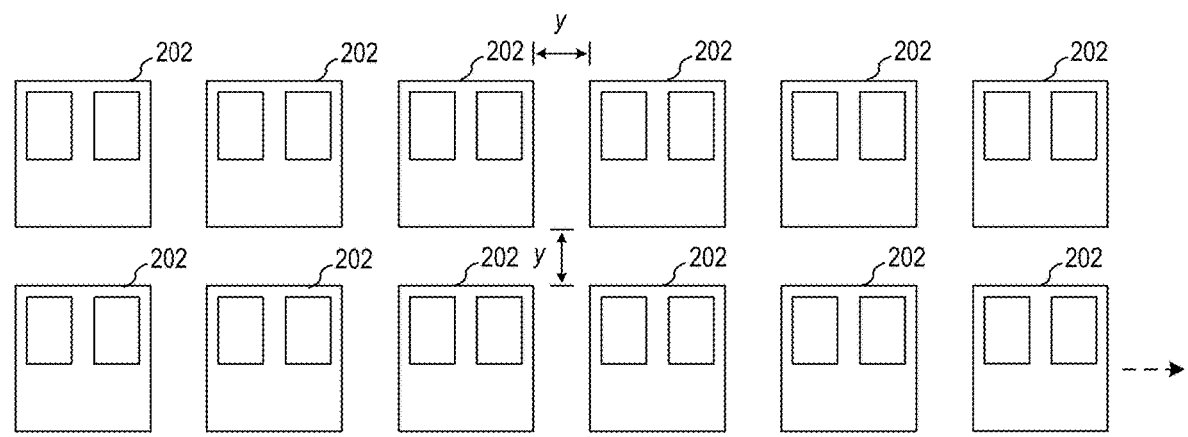

FIG. 2F illustrates millimeter-wave radar sensors 202 configured in a uniform rectangular array with a distance y between each sensor. While an array of 2×6 millimeter-wave radar sensors 202 are shown in the illustration, it should be understood that any rectangular array dimension may be used depending on the specific embodiment and its specifications. Configuring millimeter-wave radar sensors 202 in a rectangular configuration may help to improve cross-range resolution. In various embodiments, the range of the radar system is a distance between the sensor and the target, while the cross-range of the resolution pertains to a spatial resolution within a sensing place of radar sensors 202.

Figure 2G:
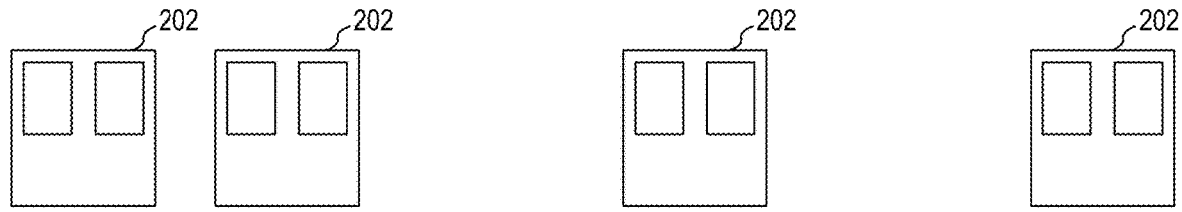
Figure 2H:
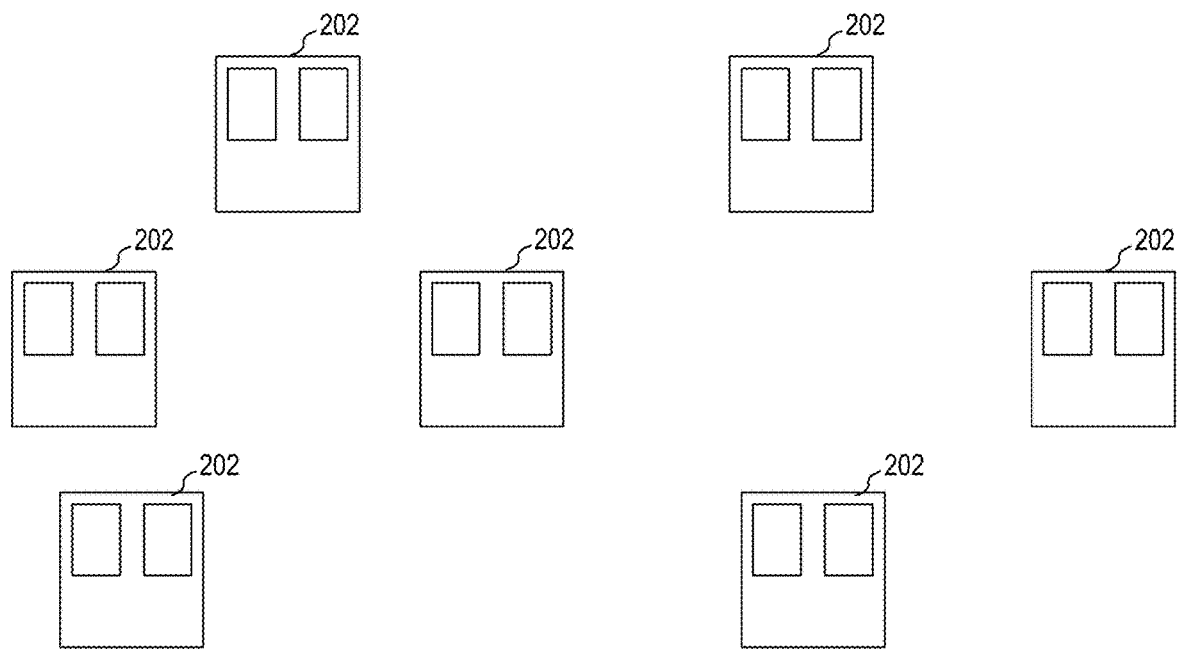

Millimeter-wave radar sensors 202 may also be implemented in a non-uniform configuration. For example, FIG. 2G illustrates millimeter-wave radar sensors 202 configured in a non-uniform linear array, and FIG. 2H illustrates millimeter-wave radar sensors 202 configured in a non-uniform two-dimensional array.

In various embodiments, millimeter-wave radar sensors 202 have a minimum distance of between $0.5\lambda$ and $0.7\lambda$ between each other where $\lambda$ is the wavelength of the millimeter-wave RF signal. This distance between millimeter-wave radar sensors 202 may be increased when the position of each sensor is known for processing extracted data.

In various embodiments, millimeter-wave radar sensors 202 may be mounted on a variety of surfaces and may be hidden under different materials and/or radome types that include, for example, polycarbonate, glass, plastics and other materials. In some embodiments, metals are not used above the sensor system. In other embodiments, a layer of metal may be used above the sensor plane as a shield or a waveguide depending on the particular system. For example, a Yagi antenna disposed on the substrate of millimeter-wave radar sensor 202 may be used to transmit or receive a signal in the same plane as the sensor. In such a case, the antenna may be rotated by 90 degrees such that the beam produced by the radar sensor is directed toward the target. A metal shield may be disposed above the antenna.

In some embodiments, millimeter-wave radar sensors 202 operate at a frequency range of 57 GHz to 64 GHz for 7 GHz bandwidth. However, different frequency ranges and bandwidths could be used, as the resolution of the system generally is proportional to the bandwidth. In some cases, the power levels transmitted by millimeter-wave radar sensors 202 may be limited to comply with government regulations, such as regulations promulgated by the United States Federal Communications Commission (FCC). In some embodiments, any uniform linear array (ULA), non-uniform linear array (NULA), uniform rectangular array (URA) or non-uniform rectangular array (NURA) may be used depending on resolution requirements, power consumption, system space available etc.

In one specific embodiment, the millimeter-wave radar system operates in the 60 GHz ISM band. During operation, the transmitted frequency varies 500 MHz. between 61.0 and 61.5 GHz using a 2 ms chirp length. The transmitted power is 20 dBm, and both transmit and receive antennas are arranged in an 8×8 array to achieve an antenna gain of 20 dB. The range of the radar is 100 m and the radar cross section (RCS) is 2 $m^2$. The gain of the receiver is 20 dB, the receive noise figure is 10 dB, and a SNR of 10 dB is achieved at the IF. It should be appreciated that this is just one example of RF metrics for an embodiment system. The performance parameters of embodiment systems may vary depending on the specific system and its implementation.

Figure 3A:
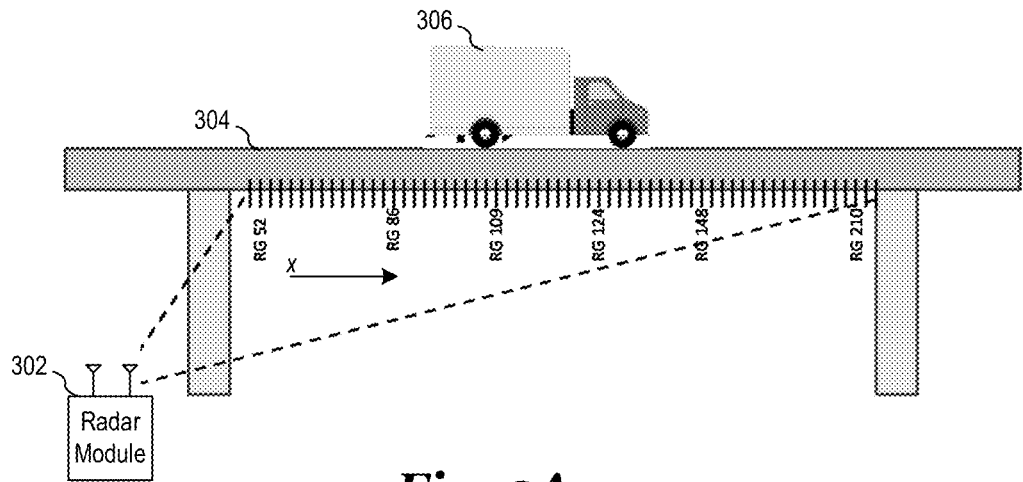
FIGS. 3A-3C illustrates a system in which embodiment millimeter-wave radar sensors are used to monitor a bridge.

FIGS. 3A-3C, 4, 5, 6A, 6B and 7A-7D illustrate several use cases for embodiment millimeter-wave radar based structural monitoring systems. FIG. 3A illustrates a system in which an embodiment millimeter-wave radar sensor 302 is used to monitor the structural integrity of a bridge 304. Radar sensor 302 may include, for example, an embodiment millimeter-wave radar system or module coupled with an antenna. In various embodiments, the lobe of the antenna of millimeter-wave radar sensor 302 is large enough to illuminate a significant part of the deck of bridge 304, so that different sections of the bridge arcade can be discriminated by their different distances from the sensor. During operation, the output of millimeter-wave radar sensor 302 is processed, for example, using a range FFT to provide a back scattered amplitude with a series of peaks. Each of these peaks corresponds to a geometrical feature of the arcade that reflects electromagnetic waves. In some embodiments, additional reference or nodal structures may be attached to bridge 304 to provide additional geometric features measurable by millimeter-wave radar sensor 302. These additional reference or nodal structures may include, for example, corner reflectors, radar cross section (RCS), and other structures that reflect millimeter-wave radar signals.

In various embodiments, a single sensor 302 can perform structural measurements of bridge 304 in at least one dimension, such as the x dimension as shown. However, in embodiments that utilize arrays of sensors and/or beam steering, measurements of bridge 304 may be made by directing the beam in multiple directions. Multiple transmit beams can be used to focus a radar beam on the structure of interest without having to manually move the radar sensor. Alternately multiple beams can help in analyzing different parts of the structure using different beams, which may potentially cover the whole structure.

During in-service deployment, the velocity/Doppler due to moving vehicle 306 is not captured in the radar measurements (thus reduced interference) in embodiments in which the radar sensors monitor the deck region of the bridge from underneath the bridge; however the movement induced deflection/deformation to the bridge itself is captured and sensed by the millimeter-wave radar sensor 302.

Figure 3B:
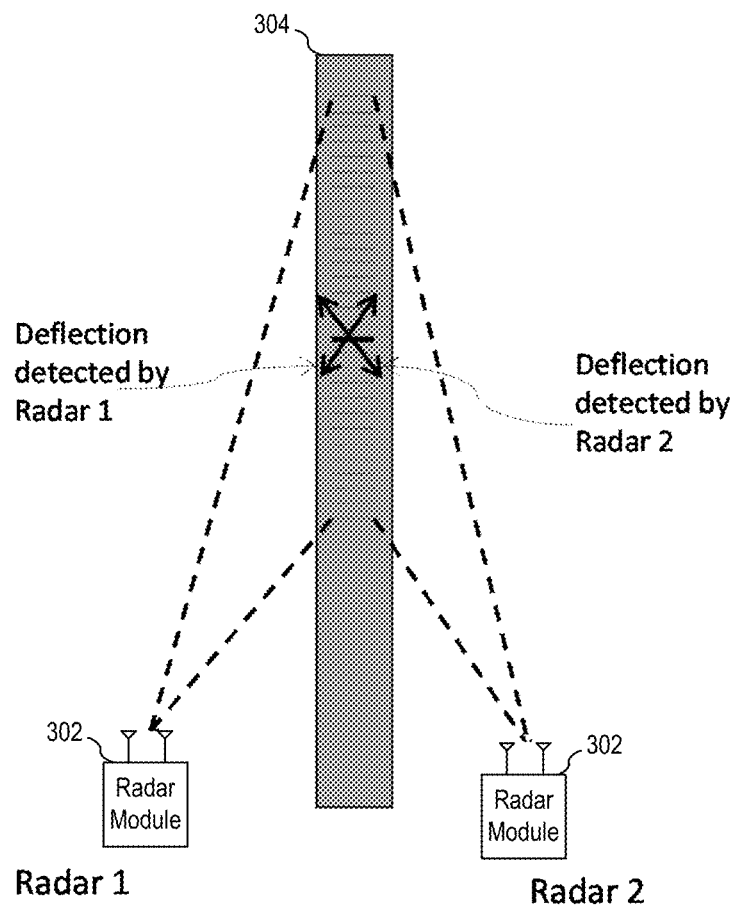

FIG. 3B illustrates a use case in which two embodiment millimeter-wave radar sensors 302 are used to monitor the structural integrity of a bridge 304. The two radar sensors 302 are positioned at opposite bases of a bridge in order to image the lower part of the deck from different angles. In various embodiments, radar data from both millimeter-wave radar sensors 302 are aligned by correlating the corresponding peaks from both the sensors, as is explained further below. Thus, by using multiple radar sensors 302, deformation of bridge 304 may be monitored in multiple directions.

Figure 3C:
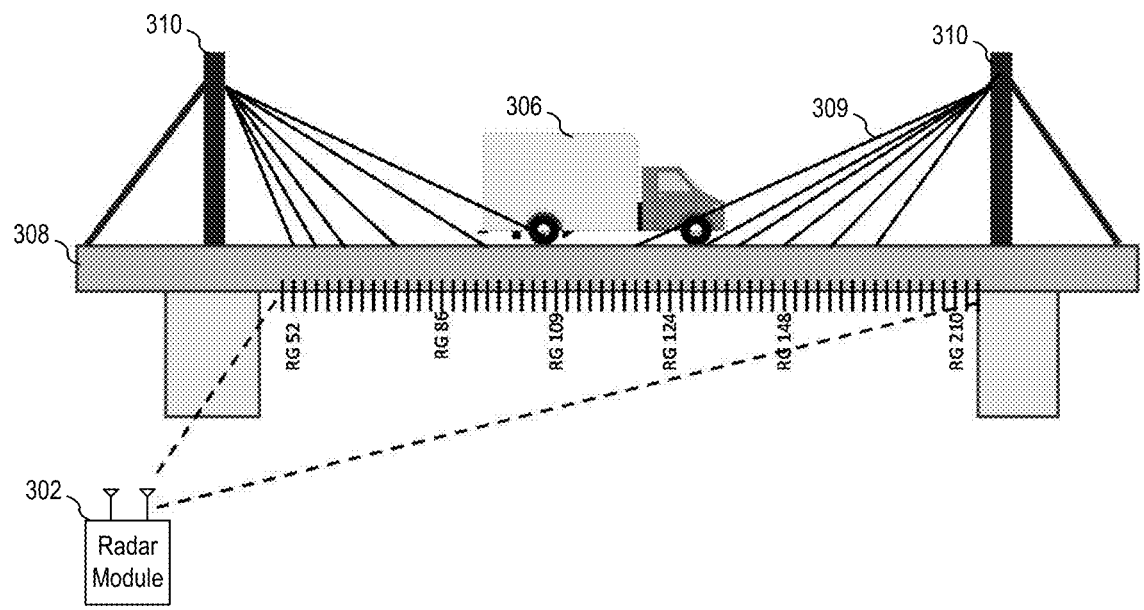

FIG. 3C illustrates a use case in which embodiment millimeter-wave radar sensor 302 is used to monitor a cable-stayed bridge 308. In various embodiments, millimeter-wave radar sensor 302 can be used to monitor stay cables 309 in addition to the deck of bridge 308. One or more millimeter wave radar sensors 302 may be installed at an angle pointing to and illuminating bridge 308 and stay cables 309. A plurality of radar sensors may be used to capture the deflection in two or three dimensions. Because the tension of each stay cable 309 is correlated to its oscillation frequency, the tension of each stay cable 309 may be determined by monitoring its oscillation frequency via interferometric Doppler measurements. An advantage of such an embodiment is the ability to monitor the integrity of bridge 308 and stay cables 309 without installing devices on cables 309 or towers 310. Thus, maintenance of monitoring devices such as radar sensor 302 may be performed without requiring personnel to be physically access monitoring devices that are located in places that are difficult or dangerous to access.

Figure 4:
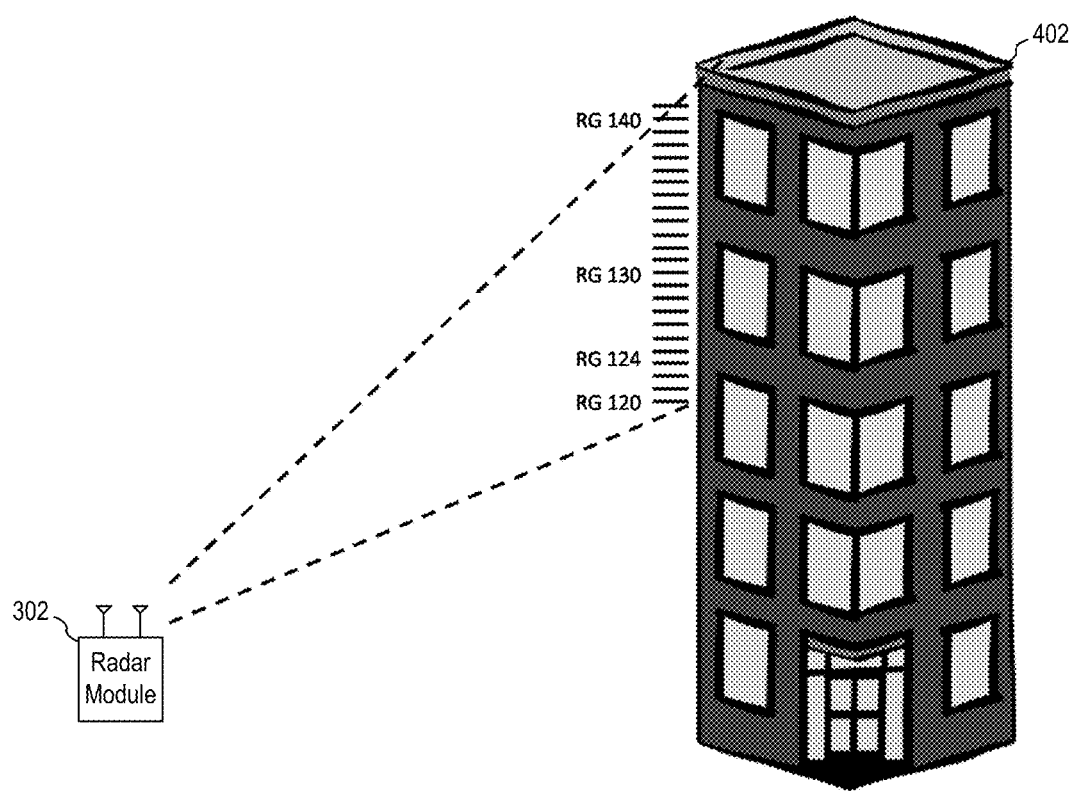
FIG. 4 illustrates a system in which an embodiment millimeter-wave radar sensor is used to monitor a building.

FIG. 4 illustrates a use case in which radar sensor 302 is used to monitor the structural integrity of building 402. Monitoring the structural integrity of building 402 is useful in that the effects of earthquakes, strong winds, and vibration inducing vehicular traffic can cause a structure to vibrate, deflect and deform. In various embodiments, these vibrations are monitored for buildings and structures in order to determine when corrective action may be taken. This is particularly relevant for aging structures and/or structures of historical importance. As the resonance frequency of a structure is directly related to its rigidity, its measured value can highlight damage that could potentially compromise the integrity of the monitored structure.

In various embodiments, one or more radar sensors 302 may be placed at various locations near building 402. Multiple radar sensors 302 may be used to monitor the vibration and deformation of building 402 in two or three dimensions.

Figure 5:
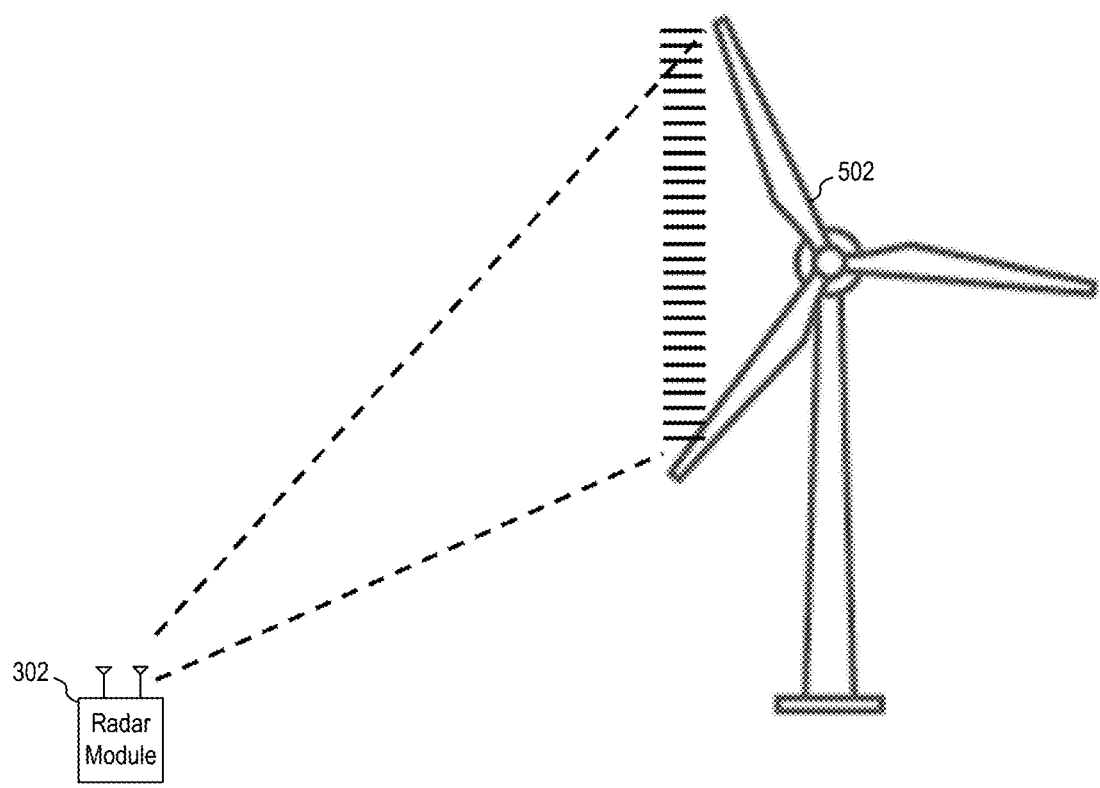
FIG. 5 illustrates a system in which an embodiment millimeter-wave radar sensor is used to monitor a wind turbine.

FIG. 5 illustrates a system in which radar sensor 302 is used to remotely monitor the structural integrity of wind turbine 502 or other structural object capable of rotation. In some embodiments, radar sensor 302 monitors the blades of wind turbine 502 when they are at rest.

Figure 6A:
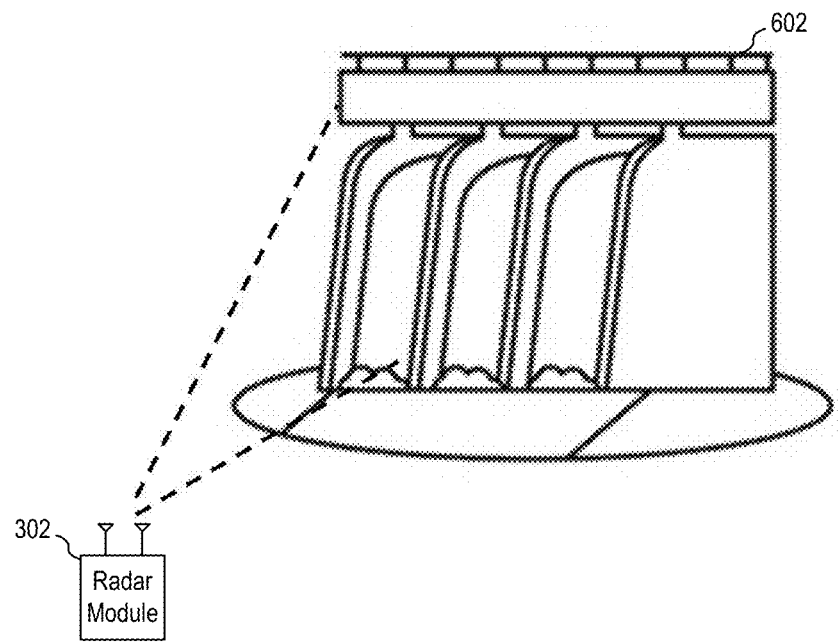
FIGS. 6A and 6B illustrate systems in which embodiment millimeter-wave radar sensors are used to monitor large civil structures.
Figure 6B:
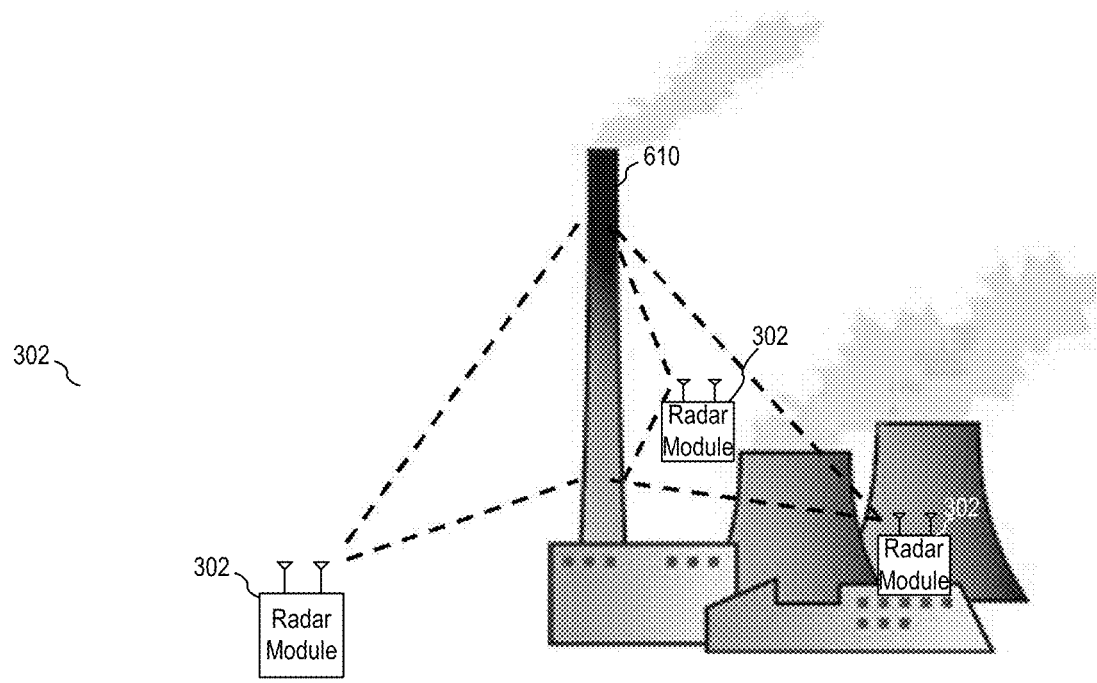

FIGS. 6A and 6B illustrate other cases in which large civil structures are monitored using embodiment radar sensing system. For example, FIG. 6A illustrates a dam 602 monitored by radar sensor 302, and FIG. 6B illustrates a power plant 610 monitored by a plurality of radar sensors 302. During operation, embodiment monitoring methods described herein may be used to determine the structural integrity of the various structures that comprise dam 602 or power plant 610. If the structural integrity monitoring system senses a structural issue, corrective action may be taken.

FIGS. 7A-7D illustrate various systems in which the structural integrity of utility poles and/or streetlamps is monitored using embodiment millimeter-wave based radar systems. Such embodiments allow for the continual monitoring of such structures, as well as the ability to determine whether the structural integrity of the monitored utility poles and/or streetlamps has been compromised prior to a catastrophic failure. In addition, the location of each utility pole and/or streetlamps may be monitored to determine whether or not a catastrophic failure, such as the object falling over, has occurred. Such monitoring may be useful, for example, during storms, hurricanes or other emergency situations in which quick damage assessments are made to determine which infrastructure objects are in need of repair.

Figure 7A:
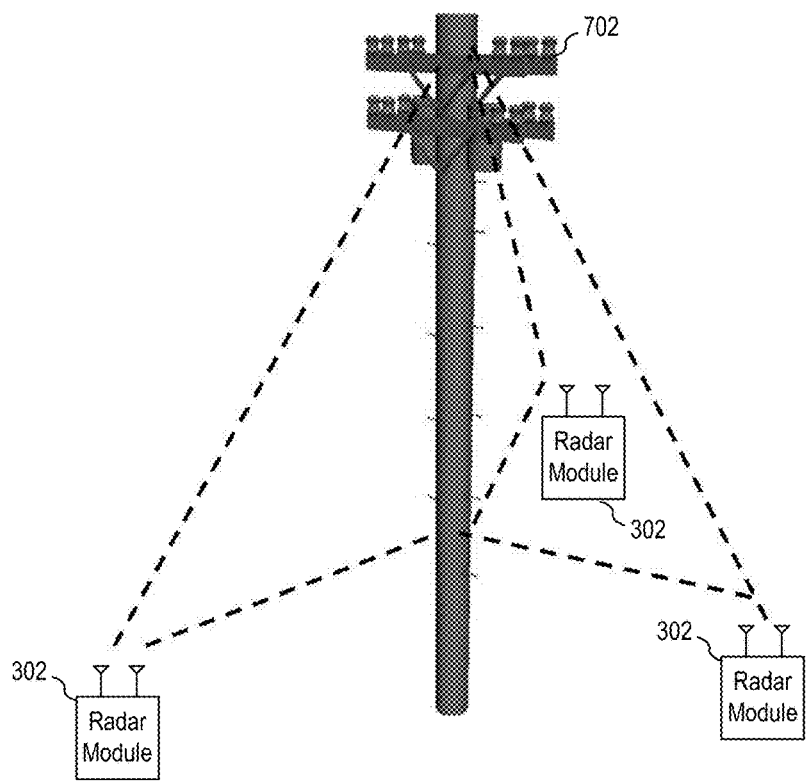
FIGS. 7A-7D illustrate systems in which the structural integrity of utility poles and/or streetlamps are monitored using embodiment millimeter-wave based radar systems.

FIG. 7A illustrates a use case in which utility pole 702 is monitored by millimeter-wave sensors 302. While three millimeter-wave radar sensors 302 are shown monitoring utility pole 702, it should be understood that any number of millimeter-wave radar sensors may be used to monitor such objects. In some embodiments, a single millimeter-wave radar sensor 302 may be used. In further embodiments, millimeter-wave sensors 302 may be configured to monitor multiple utility poles and other structural objects.

For example, the three millimeter-wave sensors 302 may be used to monitor a plurality of utility poles that are located on a particular street or along a particular stretch of highway. Similarly, FIG. 7B illustrates a use case in which the structural integrity of streetlamp 704 is monitored using a plurality of millimeter-wave sensors 302.

Figure 7B:
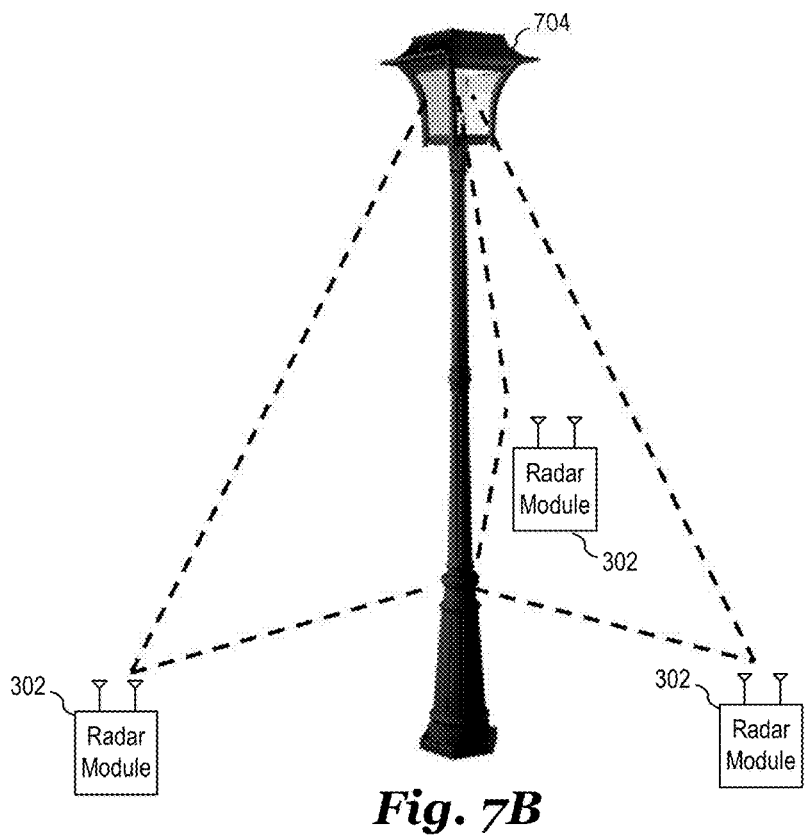
Figure 7C:
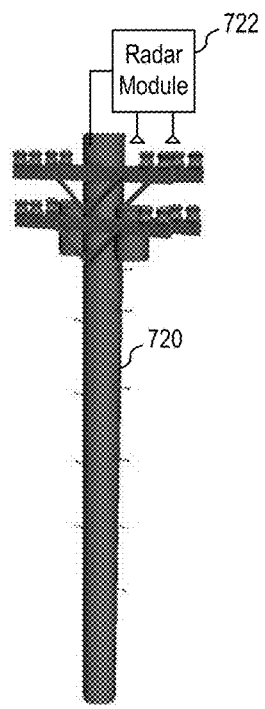
Figure 7D:
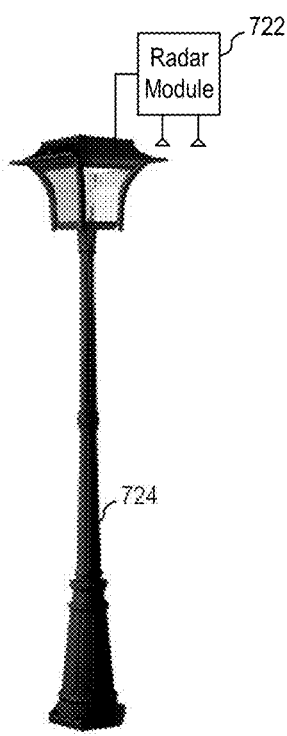

While the embodiments of FIGS. 7A and 7B illustrate use cases in which millimeter-wave radar sensors 302 are situated away from the objects being monitored, FIGS. 7C and 7D illustrate use cases in which embodiment millimeter-wave radar sensors 702 are mounted on the object that is being monitored. For example, FIG. 7C illustrates millimeter-wave radar sensor 722 mounted on utility pole 720. Similarly, FIG. 7D illustrates millimeter-wave radar sensor 722 mounted on streetlamp 724.

In various embodiments the integrity of the various utility pole and/or streetlamp structures may be determined using system and methods described herein. In addition, the gross position of each utility pole and/or streetlamp may be determined by monitoring the location of high response range gates that correspond to the position of the particular utility pole and/or streetlamp. Accordingly, the detection of a gross shift in the position of these high response range gates may indicate that the corresponding utility pole and/or streetlamp is damaged or has fallen over. In the various embodiments of FIGS. 7A-7D, the AC line frequency of 50-60 Hz may be filtered from the radar data produced by radar sensors 302 and/or 722 prior to extracting range gates from the radar measurements.

Figure 8A:
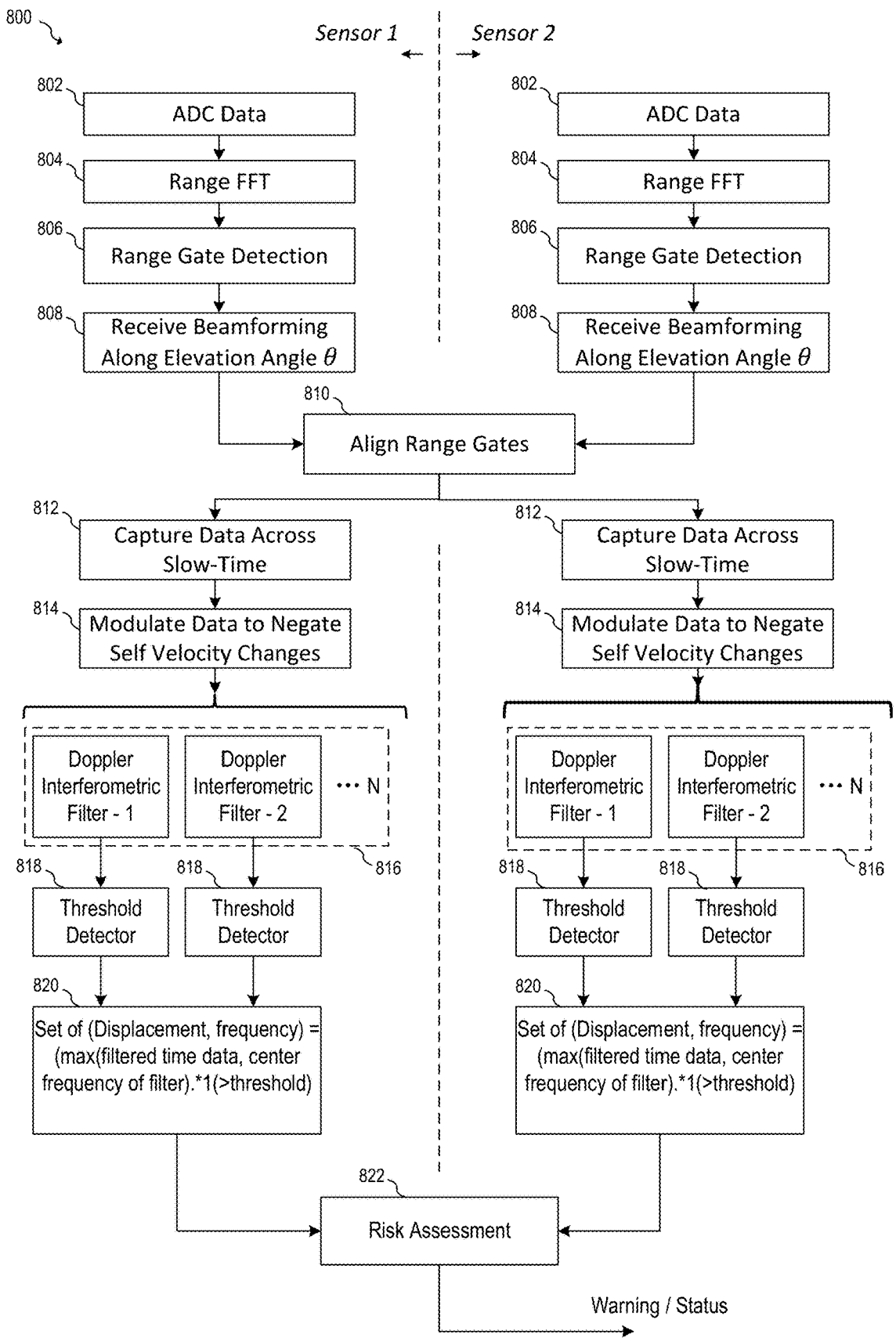
FIG. 8A illustrates a block diagram of an embodiment method.
Figure 8B:
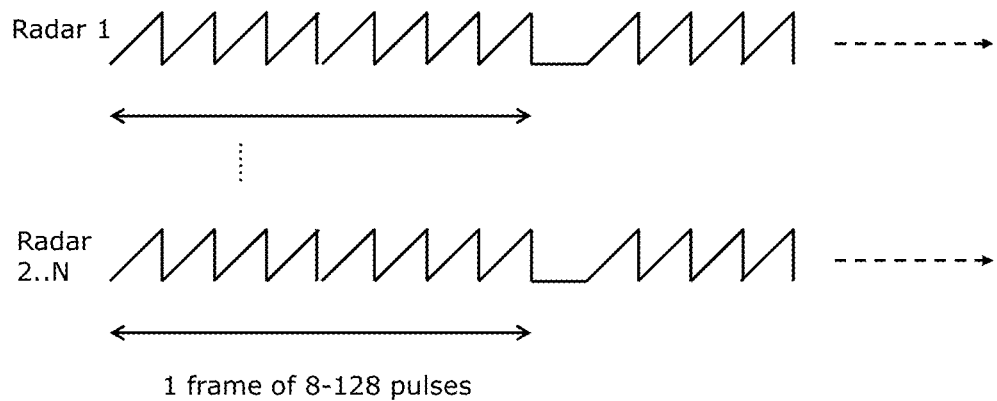
FIGS. 8B-8F include illustrative supporting figures that describe the steps of the embodiment method of FIG. 8A.

FIG. 8A illustrates a block diagram of an embodiment method 800 of performing a millimeter-wave sensor based structural integrity analysis using two radar sensors. As shown, method 800 includes two substantially parallel processing paths that are each devoted to the data produced by one of the two radar sensors. It should be appreciated, however, that the method 800 shown in FIG. 8 may be extended to include three or more radar sensors. As shown, the method starts at step 802 in which sensor data is received from the analog-to-digital converter of each respective sensor.

In step 804, a series of FFTs are calculated based on the received millimeter-wave radar sensor data received from the respective sensors in step 802. In some embodiments, a windowed FFT having a length of the chirp (e.g., 256 samples) may be calculated along each waveform for each of a predetermined number of chirps in a frame of data. In one example embodiment, each frame may include between 8 and 128 chirps as shown in the waveform diagram of FIG. 8B. Alternatively, other frame lengths may be used. The FFTs of each waveform or chirp may be referred to as a "range FFT." In alternative embodiments, other transform types could be used besides an FFT, such as a Discrete Fourier Transform (DFT) or a z-transform.

Next, in step 806, the highest amplitude FFT bins or "range gates" associated with the monitored structure are identified. These high response range gates represent the distance to the largest objects in the range of the millimeter-wave radar sensor. In some embodiments, determining these high response range gates includes determining which range gates of a first set of range gate measurements have a highest peak-to-average ratio. These high response range gates may include, for example, discrete individual range gates or clusters of range gates that are associated with portions of the structural object being monitored. In some embodiments, a single structure may have multiple identifiable structural portions that appear as corresponding multiple high response range gates. In various embodiments, the locations of these high response range gates are tracked in order to determine the motion and deformation of the structure being monitored.

Figure 8C:
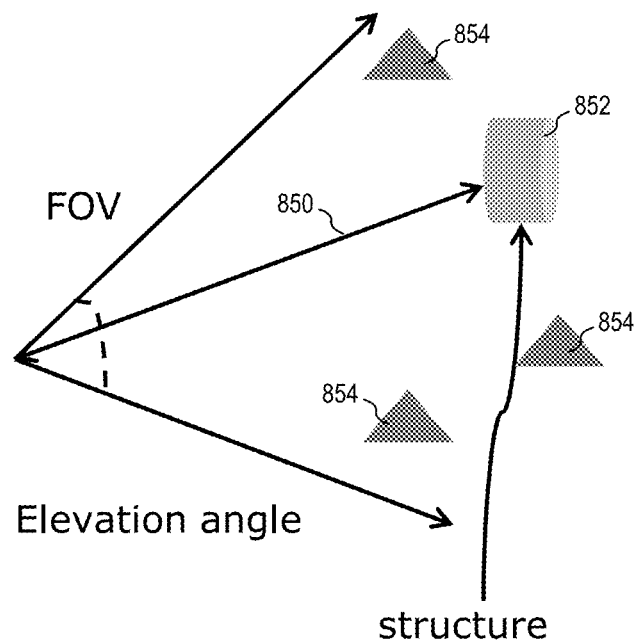

In step 808, beamforming processing is performed in order to more particularly track the structural features of the structural object being monitored. In various embodiments, beamforming may be performed in order to spatially distinguish monitored objects from other objects that are not associated with the structure being monitored. For example, as shown in FIG. 8C, the field of view (FOV) of the radar sensor may be narrowed to form an effective beam 850 that is directed toward a structural feature of interest 852, while avoiding and/or attenuating the response of objects 854 that are also within the FOV of the radar sensor. Structural feature of interest 852 may represent, for example, a structural feature of the monitored structure, while objects 854 may represent other structures or geographical features that are not being monitored by the embodiment radar sensor system. As shown, beam 850 is defined as an elevation angle. In some embodiments, beam 850 may also be defined with respect to azimuth in place of or in addition to the elevation angle.

In various embodiments, beam 850 is formed by producing a narrow beam using beamforming at the transmitter, formed by post processing a plurality of baseband signals based on a plurality of signals received by different receivers or a combination thereof. Implementing beamforming by post processing received baseband signals may allow for the implementation of a low complexity transmitter.

In one example, a millimeter-wave sensor system is used with $N_t=2$ transmit (TX) elements and $N_r=2$ receive (RX) elements arranged in a linear array. Accordingly, there are $N_t \times N_r=4$ distinct propagation channels from the TX array to the RX array in a linear array configuration for azimuth angle profiling. If the transmitting source (TX channel) of the received signals can be identified at the RX array, a virtual phased array of $N_t \times N_r$ elements can be synthesized with $N_t+N_r$ antenna elements. In various embodiments, a time division multiplexed MIMO array provides a low cost solution to a fully populated antenna aperture capable of near field imaging. In some embodiments, a symmetrical linear arrangement of the TX and the RX elements with some vertical offset between the TX array and the RX array for reduced coupling may be used.

Denoting the 3D positional coordinates of the TX element as $d_i^{Tx}$, $i=1, 2$ and the RX element as $d_j^{Rx}$, $j=1, 2$ in space, then on assuming far field conditions, the signal propagation from a TX element $d_i^{Tx}$ to a point scatterer p and subsequently the reflection from p to Rx element $d_j^{Rx}$ can be approximated as $2*x+d_{ij}$, where x is the based distance of the scatterer to the center of the virtual linear array, and $d_{ij}$ refers to the position of the virtual element to the center of the array.

Assuming that the far field conditions are met, the time delay of the radar return from a scatterer at base distance x from the center of the virtual linear array and angle θ (with respect to boresight) can be expressed as $$\tau_{ij} = \frac{2x}{c} + \frac{2d\sin(\theta)}{c}.$$

The transmit steering vector may be written as:

$$a_i^{Tx}(\theta) = \exp\left(-j2\pi \frac{d_i^{Tx}\sin(\theta)}{\lambda}\right); i = 1, 2,$$

and the receiving steering vector may be expressed as:

$$a_i^{Rx}(\theta) = \exp\left(-j2\pi \frac{d_i^{Rx}\sin(\theta)}{\lambda}\right); i = 1, 2,$$

where λ is the wavelength of the transmit signal. In some embodiments, the $N_t \times N_r$ deramped beat signal is stacked into a vector and the Kronecker product of the steering vector of the TX array $a_i^{Tx}(\theta)$ and the steering vector of the RX array $a_j^{Rx}(\theta)$, i.e. $a_i^{Tx}(\theta) \otimes a_j^{Rx}(\theta)$, which can be used to resolve the relative angle of the scatterer θ. Beamforming of the MIMO array signals can be regarded as synthesizing the received signals with the TX and RX steering vectors. Therefore, for a given range x, the azimuth imaging profile can be generated through a minimum variance distortionless response (MVDR) or Capon algorithm as:

$$P(\theta) = \frac{(a^{Tx}(\theta) \otimes a^{Rx}(\theta))^H (a^{Tx}(\theta) \otimes a^{Rx}(\theta))}{(a^{Tx}(\theta) \otimes a^{Rx}(\theta))^H C(a^{Tx}(\theta) \otimes a^{Rx}(\theta))}.$$

various embodiments, the expression for P(θ) can be used to find the elevation angle at which the target lies. In the above expression, C={x(t=τi,j)x(t=τi,j)H} represents the covariance matrix of the range bin across all virtual channels, as indicated by the delay r and corresponding to a particular location of the target structure. E{·} represents the expectation operator, which is approximated in practice by summing the argument (e.g. the outer product of the complex value from all virtual channels corresponding to a range bin of interest) over slow time/pulses. In this case of receive beamforming, the field of view of interest is limited to the elevation angle corresponding to the target of interest, thereby reducing or eliminating clutter/interference from other angles. Additionally the estimated elevation angle θ may also be used to compensate the self-motion by projecting the velocity data from the accelerometer into the direction of θ in step 814 and represented by FIG. 8F.

In some embodiments step 808 may be omitted depending on the particular system and its specifications. For example, in the absence of non-monitored objects within the FOV of the radar sensor, step 808 may not be necessary.

Figures 8D, 8E, 8F:
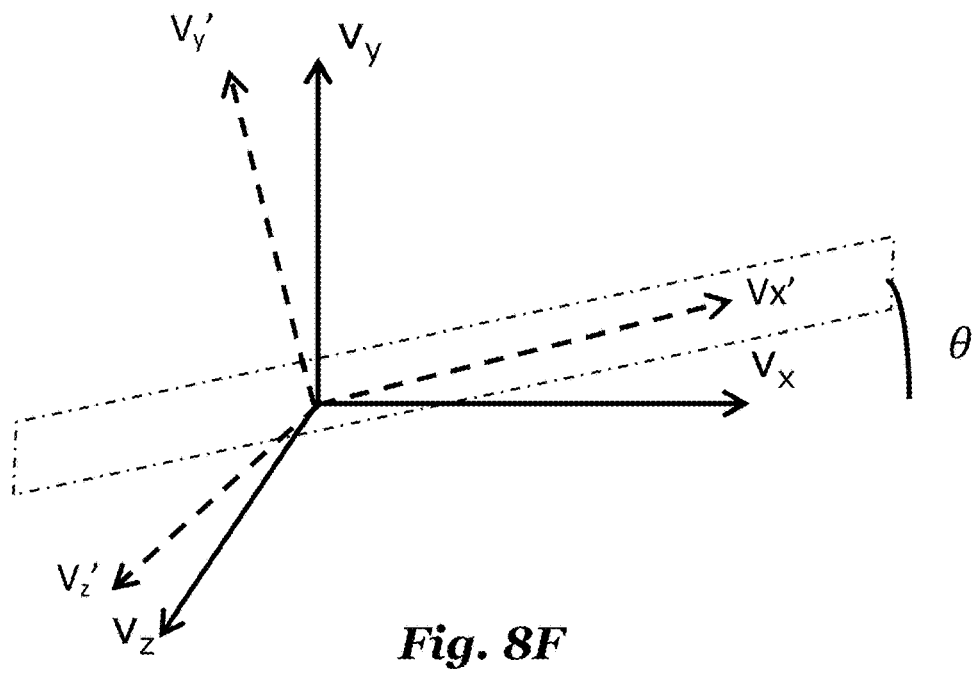

In step 810, the range gates that were determined in step 806 and optionally modified according to beamforming step 808 are aligned together as illustrated in FIGS. 8D and 8E. FIG. 8D illustrates a table indicating high response range gates for two radar sensors: Radar Sensor 1 and Radar Sensor 2. This table represents the range bins corresponding to geometric features of the monitored structure, such as nodal or reference points manually incorporated through corner reflectors or reference landmark points affixed to the structure. The range bins from both sensors correspond to these reference points. For example, reference point 1 corresponds to range bin 30 in sensor 1 and range bin 32 in sensor 2; reference point 2 corresponds to range bin 52 in sensor 1 and range bin 47 in sensor 2; and reference point 3 corresponds to range bin 98 in sensor 1 and range bin 101 to sensor 2. This can arise due to a non-symmetric placement of the sensors with respect to the monitored structure.

FIG. 8E illustrates a table that shows how new range bins from different structure locations are aligned once the preprocessing step shown with respect to the table shown in FIG. 8D. The new range bins from sensor 1 are 41 and 51, whereas the new range bins for sensor 2 are 39, 46 and 51. Based on the boundaries and following a nearest neighbor approach within these boundaries specified by the nodal range bins, range bin 41 is assigned/aligned to range bin 39, range bin 51 of sensor 1 is assigned/aligned with range bin 46 of sensor 2 and range bin 51 is treated separately not having a corresponding counter-part range bin in sensor 1. In some embodiments, operations represented by the table shown in FIG. 8D can be performed using an offline or one-time process before the monitoring starts.

After the range gates of the radar sensors are aligned, each radar channel captures data across slow-time in step 812. In some embodiments, this involves logging the aligned identified range gates over multiple range FFTs. In one specific example, slow-time data is captured at 512 μs intervals. Alternatively, other intervals may be used depending on the particular embodiment and its specifications.

Next, in step 814, the captured slow-time range gate data is adjusted to compensate for self-velocity or motion of the radar sensor itself. In some embodiments, an accelerometer that is physically attached the millimeter-wave radar sensor monitors the motion of the millimeter-wave radar sensor and provides motion data to the algorithm. In one example, the acceleration of the radar sensor itself is measured using a three-dimensional accelerometer integrated with the radar sensor. The three-dimensional acceleration is converted into velocity by an integration operation and then projected onto the elevation angle θ that is being monitored by the interferometric radar as shown in FIG. 8F, which illustrates velocity vector ($V_x$, $V_y$, $V_z$) in relation to rotated velocity vector ($V_x'$, $V_y'$, $V_z'$) and elevation angle θ. In some embodiments, θ is a predetermined elevation angle that is used in the radar sensor's beamforming setting in step 808.

In an embodiment, (Vx, Vy, Vz) represents the velocity vector data from the accelerometer arising from its orientation which forms a reference. From beamforming step 808, the calculated elevation angle of structure of interest is a certain elevation angle θ with respect to a reference. Thus, the velocity vector (Vx, Vy, Vz) data at any given time is rotated into the corresponding axis given by the desired elevation angle θ. Once the velocity vector is rotated into new coordinates ($V_x'$, $V_y'$, $V_z'$), it is possible to determine the velocity component corresponding to the line of sight (LOS) direction of the radar in which the radar measurements are experiencing perturbations. For example, if the perturbations are represented by the $V_x'$ component, this $V_x'$ component can be used to compensate for the self-motion of the radar sensor present in the measured radar data.

A coordinate transformation between the basis vectors can be defined in the xy plane as follows:

$$R_{xy}(\theta) = \begin{bmatrix} \cos(\theta) & -\sin(\theta) & 0 \\ \sin(\theta) & \cos(\theta) & 0 \\ 0 & 0 & 1 \end{bmatrix} \text{ and}$$

$$R_{xy}(\theta)\underline{v} = \underline{\tilde{v}},$$

where $$\underline{v} = \begin{bmatrix} v_x \\ v_y \\ v_z \end{bmatrix}$$

is the velocity vector provided by the accelerometer along each of its axis, $\underline{\tilde{v}}$ is the projected velocity vector along the elevation angle, and only the first element is taken for the velocity compensation over slow time, i.e. $\widetilde{\underline{v}(1)}$. Optionally if the plane of the radar elevation is different, another matrix rotation operation may be used:

$$R_{xz}(\theta) = \begin{bmatrix} \cos(\phi) & 0 & -\sin(\phi) \\ 0 & 1 & 0 \\ \sin(\phi) & 0 & \cos(\phi) \end{bmatrix}$$

making the transformation operation:

$$R_{xz}(\phi)R_{xy}(\theta)\underline{v}=\underline{\tilde{v}}.$$

The rotated velocity vector may be recomputed at the rate at which the accelerometer generates the data, which could be at a different rate used for radar data compensation (e.g., 512 µs). In such embodiments, polynomial curve-fitting may be employed. For example, curve fitting may be used if the sampling rate of the accelerometer is not an integer multiple of the radar frame rate. For example, if the radar frame rate is 100 ms and the accelerometer frame rate is 150 ms, curve-fitting may be performed to estimate the change in self-motion component over 100 ms frame boundary. This enables accurate compensation of the self-velocity with respect to the radar frame rate. In some embodiments, if the sample rate of the accelerometer rate is higher than the radar frame rate, down-sampling is performed, whereas if the sample rate of the accelerometer rate is lower than the radar frame rate, up-sampling is performed to generate self-velocity parameter at each slow-time interval used for radar data compensation (e.g., 512 µs).

The self-velocity compensation may be applied as follows:

$$s(t_s) \cdot * \exp\left(-j2\pi\left(2\frac{\widetilde{v_{t_s}(1)}}{\lambda}\right)t_s\right) = \tilde{s}(t_s),$$

where λ is the wavelength of the EM signal, $t_s$ is the slow-time interval, and $s(t_s)$ is the radar data from a particular range bin over slow time $t_s$. In various embodiments, the velocity component used for compensating all of the range bins. For example, in embodiments in which $s(t_s)$ is represented in discrete time as s(n), n (which may range from 1 to 1024 range bins for instance) represents the range bin. The above operation removes the self-velocity along the radar LOS over time and subsequent the residual phase change is due to structure vibration.

In step 816, one or more interferometric Doppler filter banks are applied to the range gates in order to extract an interferometric phase. In some embodiments, these Doppler filter banks are frequency spaced band-pass filters that are configured to monitor fluctuations/vibrations from a particular frequency component. These filter banks may be implemented digitally, for example, using infinite impulse response (IIR) or finite input response (FIR) filters.

In step 818 the output of each of the Doppler filter bans is compared to a respective threshold, and in step 820, the output of each threshold is evaluated by creating a vector of displacement/frequency pairs corresponding to each range gate whose filtered output exceeds the predetermined threshold. For example, one example vector set might be:

$(d_i, f_i) = \{(0.75 \text{ mm}, 1.2 \text{ Hz}), (0.35 \text{ mm}, 2.1 \text{ Hz}), (1.25 \text{ mm}, 0.65 \text{ Hz})\}.$ The above vector ($d_i$, $f_i$) represents a situation where an evaluation of a 0.75 mm range gate by a Doppler filter having a center frequency of 1.2 Hz exceeds a first predetermined threshold, an evaluation of a 0.35 mm range gate by a Doppler filter having a center frequency of 2.1 Hz exceeds a second predetermined threshold, and an evaluation of a 1.25 mm range gate by a Doppler filter having a center frequency of 0.65 Hz exceeds a third predetermined threshold. It should be understood that this is a numerical example. Other results may be possible depending on the particular sensor system and the structural object being monitored.

Finally, in step 822, a risk assessment is performed based on the evaluation of the millimeter-wave radar measurements in step 820. In one embodiment, a weighted sum of the threshold exceeding displacement/frequency pairs is performed to produce a risk metric as follows:

$$\text{risk} = \sum_{j \in N_{radar}} \sum_{i=1}^{N} w_i \frac{d_i}{d_{max}(i)},$$

where N represents the number of filter banks, $N_{radar}$ represents the number of radars illuminating the structure, $d_{max}(i)$ is the maximum acceptable displacement at frequency i, and $w_i$ represents the weighting function pre-associated to frequency i. The weighting function can be uniform or linearly increasing with frequency. For example, higher weights may be associated with higher frequency displacements, which is indicative of higher risks. It should be appreciated that the weighting function shown above is just one of many example embodiment weighting functions. Other weighting functions may be used depending on the particular embodiment and its specifications.

In embodiments in which millimeter-wave radar sensors 1 and 2 have different LOSs with respect to the structure being monitored, the above-mentioned risk function represents a two-dimensional displacement/vibration history of the structural object based on the two interferometric phases derived in steps 816.

Figure 9:
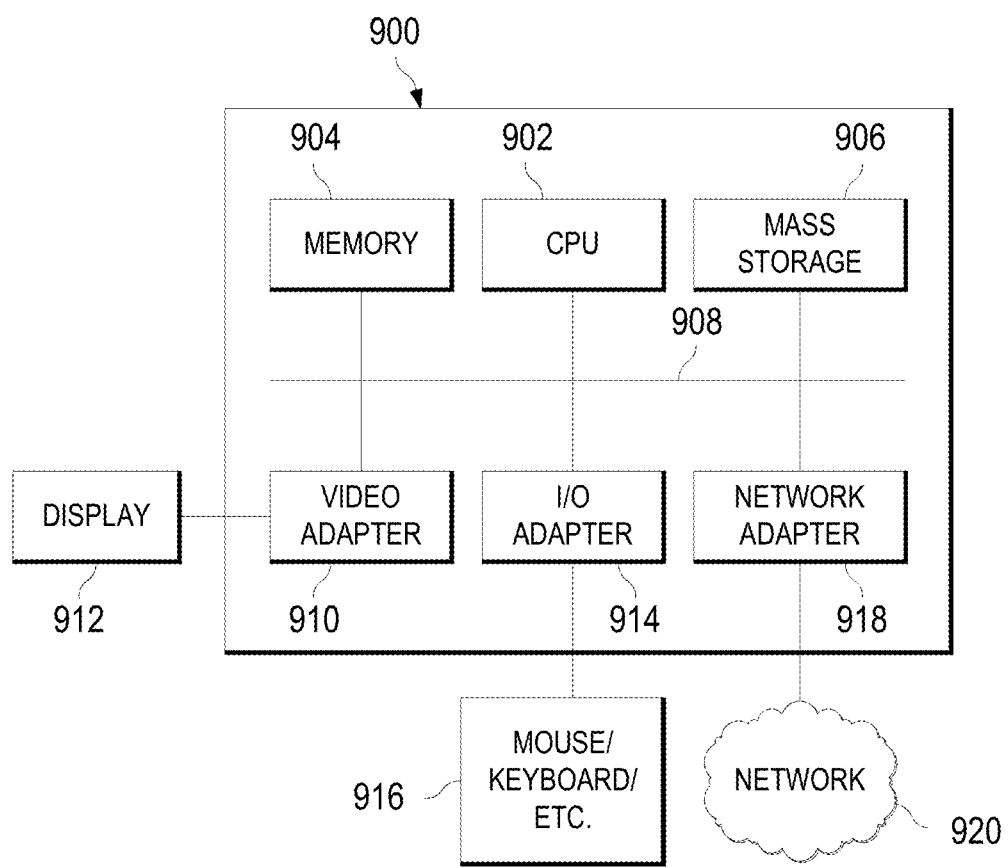
FIG. 9 a block diagram of a processing system that may be used to implement portions of embodiment structural object monitoring systems.

Referring now to FIG. 9, a block diagram of a processing system 900 is provided in accordance with an embodiment of the present invention. The processing system 900 depicts a general-purpose platform and the general components and functionality that may be used to implement portions of the embodiment radar system and/or an external computer or processing device interfaced to the embodiment radar system. The processing system 900 may include, for example, a central processing unit (CPU) 902, memory 904, and a mass storage device 906 connected to a bus 908 configured to perform the processes discussed above. The processing system 900 may further include, if desired or needed, a video adapter 910 to provide connectivity to a local display 912 and an input-output (I/O) Adapter 914 to provide an input/output interface for one or more input/output devices 916, such as a mouse, a keyboard, printer, tape drive, CD drive, or the like.

The processing system 900 also includes a network interface 918, which may be implemented using a network adaptor configured to be coupled to a wired link, such as an Ethernet cable, USB interface, or the like, and/or a wireless/cellular link for communications with a network 920. The network interface 918 may also include a suitable receiver and transmitter for wireless communications. It should be noted that the processing system 900 may include other components. For example, the processing system 900 may include power supplies, cables, a motherboard, removable storage media, cases, and the like. These other components, although not shown, are considered part of the processing system 900.

Example embodiments of the present invention are summarized here. Other embodiments can also be understood from the entirety of the specification and the claims filed herein.

Example 1

A method of monitoring a structural object includes performing a first set of radar measurements using a first millimeter-wave radar sensor to produce a first set of radar data; extracting a first interferometric phase from the first set of radar measurements; and determining a structural integrity of the structural object based on the extracted first interferometric phase.

Example 2

The method of example 1, further including measuring a motion of the first millimeter-wave radar sensor; and adjusting the first set of radar data to compensate for the measured motion of the first millimeter-wave radar sensor.

Example 3

The method of example 2, where measuring the motion of the first millimeter-wave radar sensor includes using a first accelerometer physically attached to the first millimeter-wave radar sensor.

Example 4

The method of one of examples 1-3, where the performing the first set of radar measurements includes forming a beam using an antenna array of the first millimeter-wave radar sensor.

Example 5

The method of one of examples 1-4, where extracting the first interferometric phase includes determining a first set of range gates from the first set of radar data; and filtering the first set of range gates using a Doppler interferometric filter.

Example 6

The method of example 5, where determining the structural integrity of the structural object includes comparing the first interferometric phase to a threshold.

Example 7

The method of example 5, where the Doppler interferometric filter includes a plurality of Doppler interferometric filters configured to produce a plurality of first interferometric phases; and determining the structural integrity of the structural object includes comparing the plurality of first interferometric phases with a corresponding plurality of thresholds to produce a first set of threshold results.

Example 8

The method of example 7, where determining the structural integrity of the structural object further includes calculating a weighted sum of the first set of threshold results.

Example 9

The method of example 8, further including transmitting a warning message when the weighted sum exceeds a second threshold.

Example 10

The method of one of examples 1-9, further including performing a second set of radar measurements using a second millimeter-wave radar sensor to produce a second set of radar data; and extracting a second interferometric phase from the second set of radar measurements, where determining the structural integrity of the structural object further includes determining the structural integrity of the structural object based on the second interferometric phase.

Example 11

The method of example 10, where the first millimeter-wave radar sensor and the second millimeter-wave radar sensor have a different line of sight (LOS) with respect to the structural object, and the method further includes determining a two-dimensional displacement history of the structural object based on the first interferometric phase and the second interferometric phase.

Example 12

The method of one of examples 10 and 11 where extracting the first interferometric phase includes determining a first set of range gates from the first set of radar data, and filtering the first set of range gates using a first plurality of Doppler interferometric filters; extracting the second interferometric phase includes determining a second set of range gates from the second set of radar data, and filtering the second set of range gates includes using a second plurality of Doppler interferometric filters; and determining the structural integrity of the structural object includes comparing first outputs of the first plurality of Doppler interferometric filters with a corresponding first plurality of thresholds to produce a first set of threshold results, comparing second outputs of the second plurality of Doppler interferometric filters with a corresponding second plurality of thresholds to produce a second set of threshold results, determining a first weighted sum of the first set of threshold results, determining a second weighted sum of the second set of threshold results, and determining a third weighed sum of the first weighted sum and the second weighted sum.

Example 13

The method of example 12, further including aligning the first set of range gates with the second set of range gates.

Example 14

The method of one of examples 1-13, where the structural object includes a bridge.

Example 15

The method of one of examples 1-14, further including determining an oscillation frequency of the structural object based on the extracting a first interferometric phase.

Example 16

A method of monitoring a structural object including performing a first set of radar measurements using a first millimeter-wave radar sensor to produce a first set of radar data, where the first millimeter-wave radar sensor is mounted to the structural object; extracting range gates from the first set of radar measurements; calculating a history of a displacement of the structural object based on the extracted range gates over slow-time using Doppler interferometric filters; comparing the calculated history of the displacement to a predetermined threshold; and transmitting a warning message when the calculated history of the displacement crosses the predetermined threshold.

Example 17

The method of example 16, where the first set of radar measurements include range data, velocity data and angle date of the structural object.

Example 18

The method of example 16 or 17, where the structural object includes a utility pole or a streetlamp.

Example 19

The method of one of examples 16-18, further including filtering out an AC line frequency from the first set of radar measurements prior to extracting the range gates.

Example 20

A system of for monitoring a structural object including a first millimeter-wave radar sensor; and a processor coupled to the first millimeter-wave radar sensor, the first millimeter-wave radar sensor configured to extract a first interferometric phase from a first set of radar measurements made by the first millimeter-wave radar sensor, and determine a structural integrity of the structural object based on the extracted first interferometric phase.

Example 21

The system of example 20, further including a first accelerometer physically attached to the first millimeter-wave radar sensor and operatively coupled to the processor, where the processor is further configured to adjust the first set of radar measurements to compensate for a motion of the first millimeter-wave radar sensor measured by the first accelerometer.

Example 22

The system of example 20 or 21, further including a digital interface coupled to the processor, the digital interface configured to transmit a warning message when the determined structural integrity exceeds a first condition.

Advantages of embodiments include the ability to estimate simultaneously and remotely the displacement of different parts of the civil structures with a high degree of accuracy and repeatability. In some embodiments, the ambient variation of civil structures such as bridges, cable-stayed bridges and towers can be monitored with sub-millimeter precision of displacement.

A further advantage includes the ability to deploy embodiment radar sensors hundreds of meters away from the object being monitored, thereby avoiding contact with the monitored structure. Such radar systems may also be safely and inexpensively installed. Another advantage includes the ability for embodiment radar sensor systems to operate remotely and in severe weather conditions.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method of monitoring a structural object, the method comprising:
performing a first set of radar measurements using a first millimeter-wave radar sensor to produce a first set of radar data;

performing a second set of radar measurements using a second millimeter-wave radar sensor to produce a second set of radar data;
extracting a first interferometric phase from the first set of radar measurements;
extracting a second interferometric phase from the second set of radar measurements; and
determining a structural integrity of the structural object based on the extracted first interferometric phase and based on the second interferometric phase.

2. The method of claim 1, further comprising:
measuring a motion of the first millimeter-wave radar sensor; and
adjusting the first set of radar data to compensate for the measured motion of the first millimeter-wave radar sensor.

3. The method of claim 2, wherein measuring the motion of the first millimeter-wave radar sensor comprises using a first accelerometer physically attached to the first millimeter-wave radar sensor.

4. The method of claim 1, wherein the performing the first set of radar measurements comprises forming a beam using an antenna array of the first millimeter-wave radar sensor.

5. The method of claim 1, wherein extracting the first interferometric phase comprises:
determining a first set of range gates from the first set of radar data; and
filtering the first set of range gates using a Doppler interferometric filter.

6. The method of claim 5, wherein determining the structural integrity of the structural object comprises comparing the first interferometric phase to a threshold.

7. The method of claim 5, wherein:
the Doppler interferometric filter comprises a plurality of Doppler interferometric filters configured to produce a plurality of first interferometric phases; and
determining the structural integrity of the structural object comprises comparing the plurality of first interferometric phases with a corresponding plurality of thresholds to produce a first set of threshold results.

8. The method of claim 7, wherein determining the structural integrity of the structural object further comprises calculating a weighted sum of the first set of threshold results.

9. The method of claim 8, further comprising transmitting a warning message when the weighted sum exceeds a second threshold.

10. The method of claim 1, wherein the first millimeter-wave radar sensor and the second millimeter-wave radar sensor have a different line of sight (LOS) with respect to the structural object, and the method further comprises determining a two-dimensional displacement history of the structural object based on the first interferometric phase and the second interferometric phase.

11. The method of claim 1, wherein:
extracting the first interferometric phase comprises determining a first set of range gates from the first set of radar data, and filtering the first set of range gates using a first plurality of Doppler interferometric filters;
extracting the second interferometric phase comprises determining a second set of range gates from the second set of radar data, and filtering the second set of range gates comprises using a second plurality of Doppler interferometric filters; and
determining the structural integrity of the structural object comprises
comparing first outputs of the first plurality of Doppler interferometric filters with a corresponding first plurality of thresholds to produce a first set of threshold results,
comparing second outputs of the second plurality of Doppler interferometric filters with a corresponding second plurality of thresholds to produce a second set of threshold results,
determining a first weighted sum of the first set of threshold results,
determining a second weighted sum of the second set of threshold results, and
determining a third weighed sum of the first weighted sum and the second weighted sum.

12. The method of claim 11, further comprising aligning the first set of range gates with the second set of range gates.

13. The method of claim 1, wherein the structural object comprises a bridge.

14. The method of claim 1, further comprising determining an oscillation frequency of the structural object based on the extracting the first interferometric phase.

15. A method of monitoring a structural object, the method comprising:
performing a first set of radar measurements using a first millimeter-wave radar sensor to produce a first set of radar data, wherein the first millimeter-wave radar sensor is mounted to the structural object;
performing a second set of radar measurements using a second millimeter-wave radar sensor to produce a second set of radar data;
extracting first range gates from the first set of radar measurements;
extracting second range gates from the second set of radar measurements;
calculating a history of a displacement of the structural object based on the extracted first range gates over slow-time using first Doppler interferometric filters, and based on the extracted second range gates over slow-time using second Doppler interferometric filters;
comparing the calculated history of the displacement to a predetermined threshold; and
transmitting a warning message when the calculated history of the displacement crosses the predetermined threshold.

16. The method of claim 15, wherein the first set of radar measurements comprise range data, velocity data and angle date of the structural object.

17. The method of claim 15, wherein the structural object comprises a utility pole or a streetlamp.

18. The method of claim 15, further comprising filtering out an AC line frequency from the first set of radar measurements prior to extracting the range gates.

19. A system of for monitoring a structural object, the system comprising:
a first millimeter-wave radar sensor;
a second millimeter-wave radar sensor; and
a processor coupled to the first millimeter-wave radar sensor and to the second millimeter-wave radar sensor, the processor configured to:
extract a first interferometric phase from a first set of radar measurements made by the first millimeter-wave radar sensor,
extract a second interferometric phase from a second set of radar measurements made by the second millimeter-wave radar sensor, and determine a structural integrity of the structural object based on the extracted first interferometric phase and based on the extracted second interferometric phase.

20. The system of claim 19, further comprising a first accelerometer physically attached to the first millimeter-wave radar sensor and operatively coupled to the processor, where the processor is further configured to adjust the first set of radar measurements to compensate for a motion of the first millimeter-wave radar sensor measured by the first accelerometer.

21. The system of claim 19, further comprising a digital interface coupled to the processor, the digital interface configured to transmit a warning message when the determined structural integrity exceeds a first condition.

* * * * *